(12) United States Patent
Gorman

(10) Patent No.: US 10,269,035 B2
(45) Date of Patent: Apr. 23, 2019

(54) ON-THE-FLY GENERATION OF ONLINE PRESENTATIONS

(71) Applicant: MARKETING TECHNOLOGY LIMITED, Christchurch (NZ)

(72) Inventor: Blair Gorman, Christchurch (NZ)

(73) Assignee: MARKETING TECHNOLOGY LIMITED, Christchurch (NZ)

( * ) Notice: Subject to any disclaimer, the term of this patent is extended or adjusted under 35 U.S.C. 154(b) by 241 days.

(21) Appl. No.: 14/788,139

(22) Filed: Jun. 30, 2015

(65) Prior Publication Data

US 2017/0003828 A1    Jan. 5, 2017

(51) Int. Cl.
| | |
|---|---|
| *H04N 21/43* | (2011.01) |
| *G06Q 30/02* | (2012.01) |
| *G06Q 50/20* | (2012.01) |
| *H04N 21/81* | (2011.01) |

(52) U.S. Cl.
CPC ......... *G06Q 30/0241* (2013.01); *G06Q 50/20* (2013.01); *H04N 21/4307* (2013.01); *H04N 21/8106* (2013.01)

(58) Field of Classification Search
CPC .. G06F 3/0481; G06F 3/167; G06F 17/30017; G06F 17/30056
See application file for complete search history.

(56) References Cited

U.S. PATENT DOCUMENTS

| | | | |
|---|---|---|---|
| 6,342,904 B1 | 1/2002 | Vasudevan et al. | |
| 2004/0122539 A1 | 6/2004 | Ainsworth | |
| 2008/0104494 A1* | 5/2008 | Widdowson | G11B 27/10 715/203 |
| 2008/0126943 A1* | 5/2008 | Parasnis | G06Q 10/10 715/730 |
| 2008/0195981 A1 | 8/2008 | Pulier et al. | |
| 2009/0077460 A1 | 3/2009 | Li | |
| 2011/0154197 A1* | 6/2011 | Hawthorne | G06F 17/3002 715/704 |
| 2012/0084654 A1* | 4/2012 | Lee | G06F 9/4443 715/721 |
| 2014/0365897 A1 | 12/2014 | Maloney | |

OTHER PUBLICATIONS

International Search Report, International Application No. PCT/IB2016/000938, dated Dec. 20, 2016.

* cited by examiner

*Primary Examiner* — Jennifer N To
*Assistant Examiner* — Amy P Hoang
(74) *Attorney, Agent, or Firm* — Robert G. Crouch; Marsh Fischmann & Breyfogle LLP

(57) ABSTRACT

Techniques for collecting user data about a visitor to a website, and at least partially based thereon generating dynamically, on-the-fly, a series of visual slides and an accompanying, synchronized, audio track to enable an online presentation to be played for the visitor. After the presentation is played, or in the middle thereof, further user data can be collected from the visitor, and an additional presentation or a modification to the existing presentation can be played for the visitor. The presentation is composed of multiple sequential frames that each are composed of one or more audio files. Each visual slide has accompanying synchronization information that specifies which audio file is to be played at and at what point in the audio file.

17 Claims, 24 Drawing Sheets

ON-THE-FLY GENERATION OF ONLINE PRESENTATIONS

BACKGROUND

In the field of proving audio-visual presentations, providing a video with a series of visual images synchronized to an audio track is well known. Generally, as used herein, video refers to a digital file that contains a series of digital visual images (typically at a frame rate of 20-25 frames/images per second, although it can include slower and faster frame rates) and also contains a digital audio track synchronized to the series of visual images. Of course, there is a large volume of video-related topics not dealt with here, including video compression, various video standards, and various video storage and transport mediums.

Some videos are designed for large audiences. Other videos are designed for a small audience or an individual. In the area of sales and marketing, it is sometimes the case that an entity will desire to provide a personalized or customized video experience for each different targeted individual. Currently, it is known to combine PowerPoint or Keynote presentations with a matching audio (voiceover) track and create a video. This may include encoding the video for online playback (e.g. an MP4 video file), storing the video on a server, and subsequently and selectively streaming the video file to the end user. There are, however, a number of inherent limitations with this practice. First, since the video is pre-recorded, it severely limits the possibilities for personalization. While it is possible to create a number of different videos to attempt to provide more personalization, the number of pre-recorded videos required would grow exponentially as the number of included personalized variables (name, age, and so forth) increases. Second, encoding a slide-style presentation as a video is very inefficient from a bandwidth perspective. Video is normally encoded at 25-30 frames per second, while a typical slide presentation may require an average of less than 1 frame per second. Thus, the bandwidth and time required for sending that amount of video information from a website server to a user's computer can be significant.

It is against this background that the techniques described herein have been developed.

SUMMARY

Disclosed herein is a method for generating and playing online presentations, the method including: receiving input data from a user; after receiving the input data, generating one or more portions of an audio track for an online presentation, the audio track including information related to at least a portion of the input data; after receiving the input data, generating on-the-fly one or more visual slides for the online presentation, the one or more slides including information related to at least a portion of the input data; after receiving the input data, generating synchronization information that includes when in each audio track a particular one of the one or more visual slides should be displayed; and playing the audio track while displaying the one or more visual slides in accordance with the synchronization information.

The input data may include the user's name. The input data may include the user's birth date. Generating one or more portions of the audio track may include using one or more pre-recorded audio clips that include the user's name. The synchronization information may include the length of time to display each slide.

Also disclosed is a method for generating online presentations, the method including: receiving input data from a user that visits a website; after receiving the input data, generating one or more portions of an audio track for an online presentation, the audio track including information related to at least a portion of the input data; after receiving the input data, generating on-the-fly one or more visual slides for the online presentation, the one or more slides including information related to at least a portion of the input data; generating synchronization information that specifies when each slide should be displayed relative to the audio track; and providing the audio track, the visual slides, and the synchronization information for the user to access.

The audio track may be composed of a plurality of sequential frames, where each frame contains one or more audio files. The audio track may have a time length that is the sum of each of the time durations of the sequential frames. The synchronization information may provide that each sequential frame has a slide to be displayed at the start thereof. One or more of the visual slides may have accompanying information related to the time duration for the slide to be displayed. The audio track may be composed of a plurality of sequential frames, where each frame contains one or more audio files, and wherein the synchronization information includes information associated with each slide that specifies which audio file it is to be displayed with and at what point in time in the audio file it is to be displayed. Portions, but less than all, of the audio tracks and less than all of the slides are provided to the user before additional portions of the audio track and additional slides are generated.

Also disclosed is a method for playing back online presentations, comprising: web browser providing input data to a website about a user of the web browser that visits the website; the web browser subsequently receiving from the website an audio track for a presentation, visual slides for the presentation, and synchronization information for the presentation, wherein the synchronization information specifies when each slide should be displayed relative to the audio track; and based thereon, the web browser playing the audio track for the user while displaying the visual slides in accordance with the synchronization information. At least portions of the visual slides and the synchronization information were created subsequently to the input data being provided to the website.

The web browser may generate graphics that are at least partially based on the input data; and based thereon, the web browser overlaying the graphics on top of one or more of the visual slides. At least portions of the graphics may have been created subsequently to the input data being provided to the website. The input data may include the user's name. The input data may include the user's birth date. Generating one or more portions of the audio track may include using one or more pre-recorded audio clips that include the user's name. The synchronization information may include the length of time to display each slide.

Also disclosed is a method for interacting with a visitor to a website, including: receiving user data from the visitor to the website; based in part on the user data, generating an audio track and a synchronized series of visual slides to accompany the audio track; playing the audio track and slides for the visitor; receiving additional user data from the visitor; and providing an opportunity for the visitor to make a selection of a product or service.

Also disclosed is a method for playing online presentations for a user, comprising: a web browser providing input data to a website about a user of the web browser that visits the website; the web browser subsequently receiving from the website an audio track for a presentation, text to appear in and format information for visual slides to be generated for the presentation, and synchronization information for the presentation, wherein the synchronization information specifies when each visual slide should be displayed relative to the audio track; generating visual slides from the received text and format information; and based thereon, the web browser playing the audio track for the user while displaying the visual slides in accordance with the synchronization information. At least portions of the visual slides and the synchronization information were created subsequently to the input data being provided to the website.

Also disclosed is a method for playing online presentations for a user, including: a web browser providing input data to a website about a user of the web browser that visits the website; the web browser playing a visual and audio presentation for the user; the web browser generating graphics that are at least partially based on the input data; and based thereon, the web browser overlaying the graphics on top of the visual and audio presentation. At least portions of the graphics were created subsequently to the input data being provided to the website.

The visual and audio presentation may include a video presentation. The visual portion of the visual and audio presentation may include a series of visual slides.

Also disclosed is a method for generating and sending an email, including: receiving input data from a user; after receiving the input data, generating one or more visual images that include information related to at least a portion of the input data; after receiving the input data, generating on-the-fly an email to send to the user, the email including the generated one or more visual images; and sending the email to the user.

The visual image may be a visual slide.

DETAILED DESCRIPTION

Figure 1:
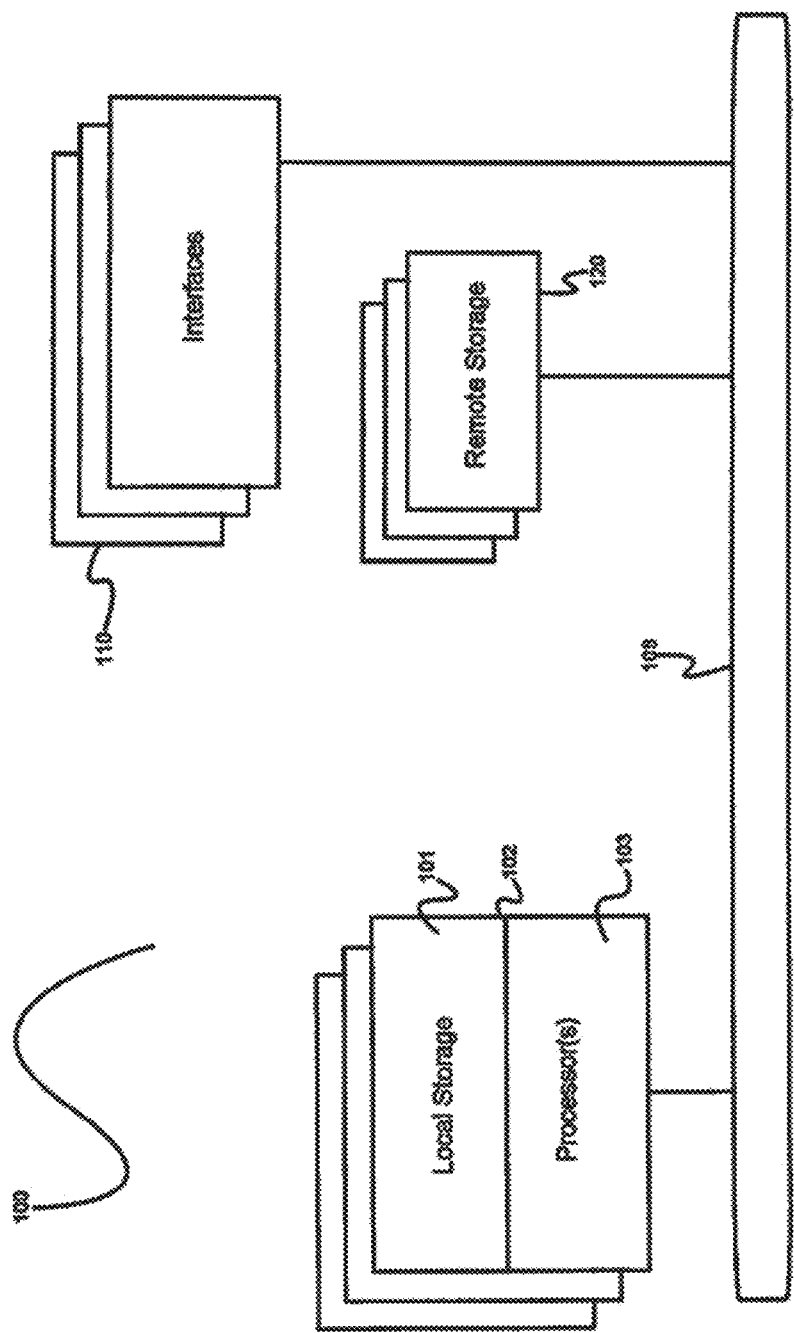
FIG. 1 is a block diagram illustrating an exemplary hardware architecture of a computing device used in an embodiment of the disclosure herein.

While the disclosure is susceptible to various modifications and alternative forms, specific embodiments thereof have been shown by way of example in the drawings and are herein described in detail. It should be understood, however, that it is not intended to limit the disclosure to the particular form disclosed, but rather, the disclosure is to cover all modifications, equivalents, and alternatives falling within the scope as defined by the claims.

The present disclosure generally relates to functionality that may be utilized in creating and delivering an audio-visual slide presentation, completely personalized for the individual website visitor. Each visitor to the website can see a completely unique presentation created specifically for that visitor, based on their user data (which may include, but is not limited to, user-supplied data, personal information, and demographic or psychographic information of the individual user).

The techniques include a number of key concepts. First of all, it includes the dynamic generation of slides, rendering text-based slides (including charts/images where required) into images for inclusion into the presentation. Second, it includes the dynamic splicing of audio files into a continuous audio stream which will constitute the audio part of the presentation.

"Dynamic," in the context above, simply means when a visitor lands on a web page, all the necessary slides and audio are created/spliced subsequent to that moment, for delivery via the user's web browser. In this manner, a completely personalized presentation is built with no noticeable delay.

Fortunately, with the techniques disclosed herein, using video as the delivery method for a keynote presentation is no longer necessary. All that is required are an audio track, images of the individual slides (which may either be pre-determined or dynamically rendered), and the timings of those images (i.e. how long each image should appear for, in order to sync with the audio track). Because only each new visual image (which may occur at a rate of one per second rather than 25-30 per second) and the audio track need be streamed to the user, the bandwidth required is significantly less than the bandwidth required to stream a video. These techniques are enabled in part through the use of HTML5.

Figure 4:
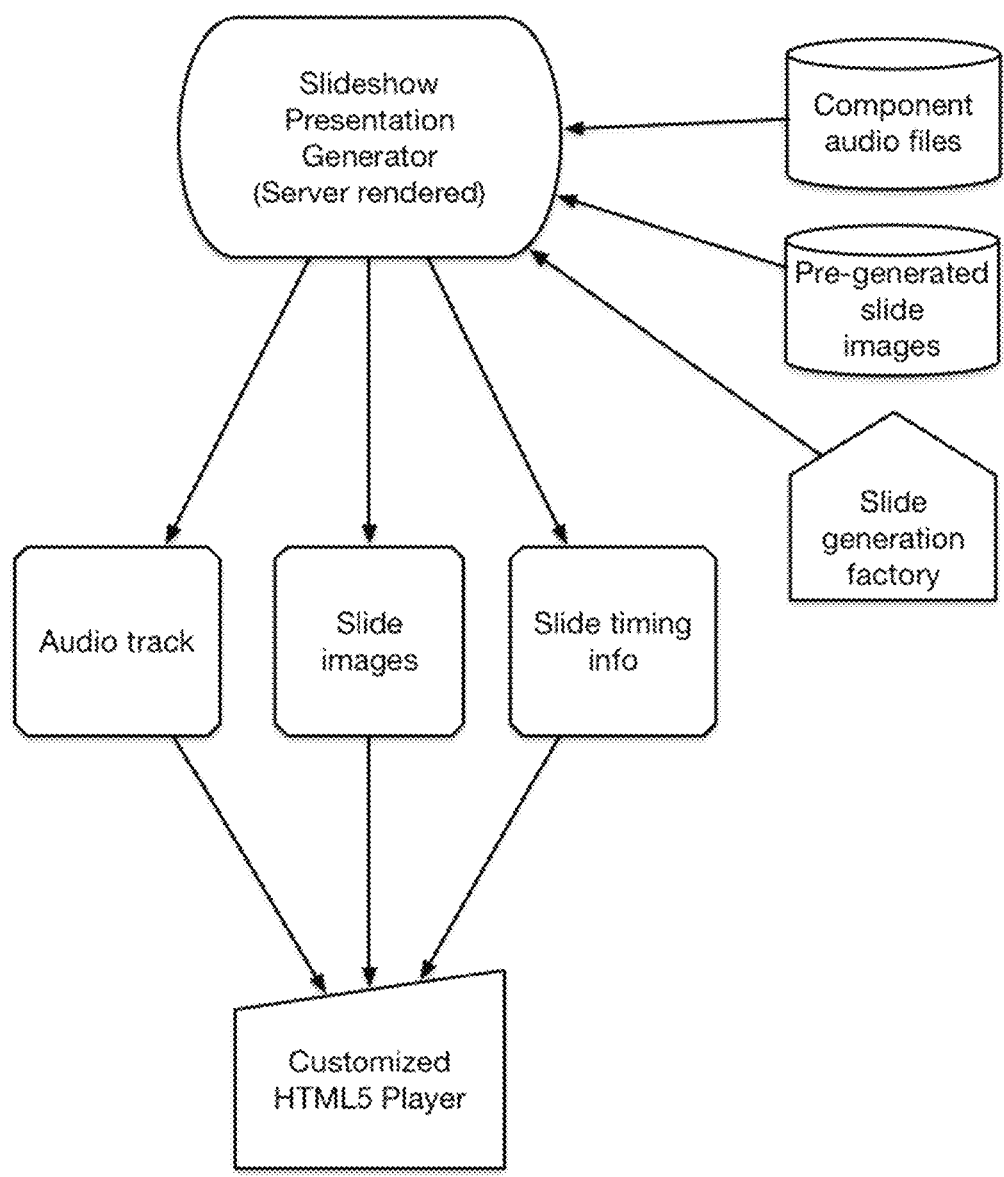
FIG. 4 is a generalized and simplified illustration of the techniques for presenting the slideshow and accompanying audio track, in the instance where slide images are created on the server and streamed to the client.

A generalized and simplified illustration of the system for creating the slideshow and accompanying audio track are provided in FIG. 4. A system 20 includes a slideshow presentation generator 22 (server rendered), which receives component audio files 24 that have been stored in memory, pre-generated slide images 26 that have been stored in memory, and slides from a slide generation factory 28. With these various inputs, the slideshow presentation generator 22 creates an audio track 30, a plurality of slide images 32, and slide timing information 34 that is provided to a customized HTML5 Player.

As part of creating the audio track, a technique known as audio splicing may be performed. This can include retrieval and concatenation of component audio files. For example, in one embodiment, audio clips have been generated for the most 2,000 most popular first names. According to US census data these 2,000 first names cover well over 80% of the US population. Website visitors with names not included in the 2,000 names can still be provided a presentation which is personalized in terms of generated slides, but with a slightly more generic audio track. These 2,000 audio files, one for each of the 2,000 most popular names, may be named, for example, "hi-anna.mp3", "hi-anne.mp3", "hi-bill.mp3", "hi-charles.mp3", etc.

In actuality, there may be a great deal more than 2,000 such audio files, since in one embodiment each name is recorded more a plurality of times, with various inflections (for a more seamless experience when the clip is combined with other audio clips). Plus, some words naturally roll into one another, so these may be recorded as a clip. For example, it is very challenging for the words "Hello" and "Anna" to be recorded separately and spliced together to sound completely natural, since the vowels naturally run together in natural speech. So, "Hello Anna" is recorded as a single clip, as are all the other names.

The next audio clip might be the next sentence, in this case "Welcome Back," which might reside in the file "welcome-back.mp3".

So, these two audio files are spliced together to create an audio track portion that sounds completely natural and seamless, e.g. "Hi Anna Welcome back". This portion can be added to the first frame (frames are described more below).

Figure 5:
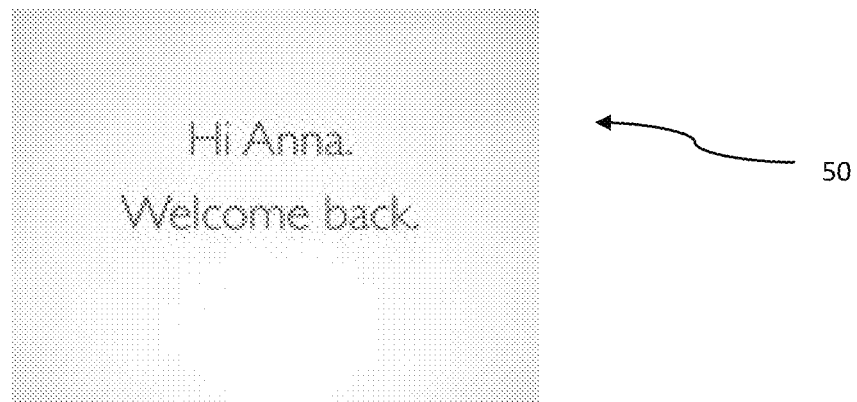
FIG. 5 is an example of a slide that might be generated.

The accompanying visual slide is generated, which would say the same thing as the audio track portion. A library of subprograms can be created to do this. The generation of the slide can include passing the text (including the name) to the slide generation factory, and it could render an image (PNG, GIF, JPEG, or other) for playback by the visitors' web browser. This could result in an image which might look like the image 50 shown in FIG. 5.

Having a large number of audio files and a large number of slides, and trying to sync them together perfectly, could possibly become difficult as the number of files grow. Partly for this reason, the concept of a "Frame" has been created. In this case, a Frame is a smaller segment of audio files and visual slides. All the Frames can then be concatenated, to create the final presentation.

Figure 6:
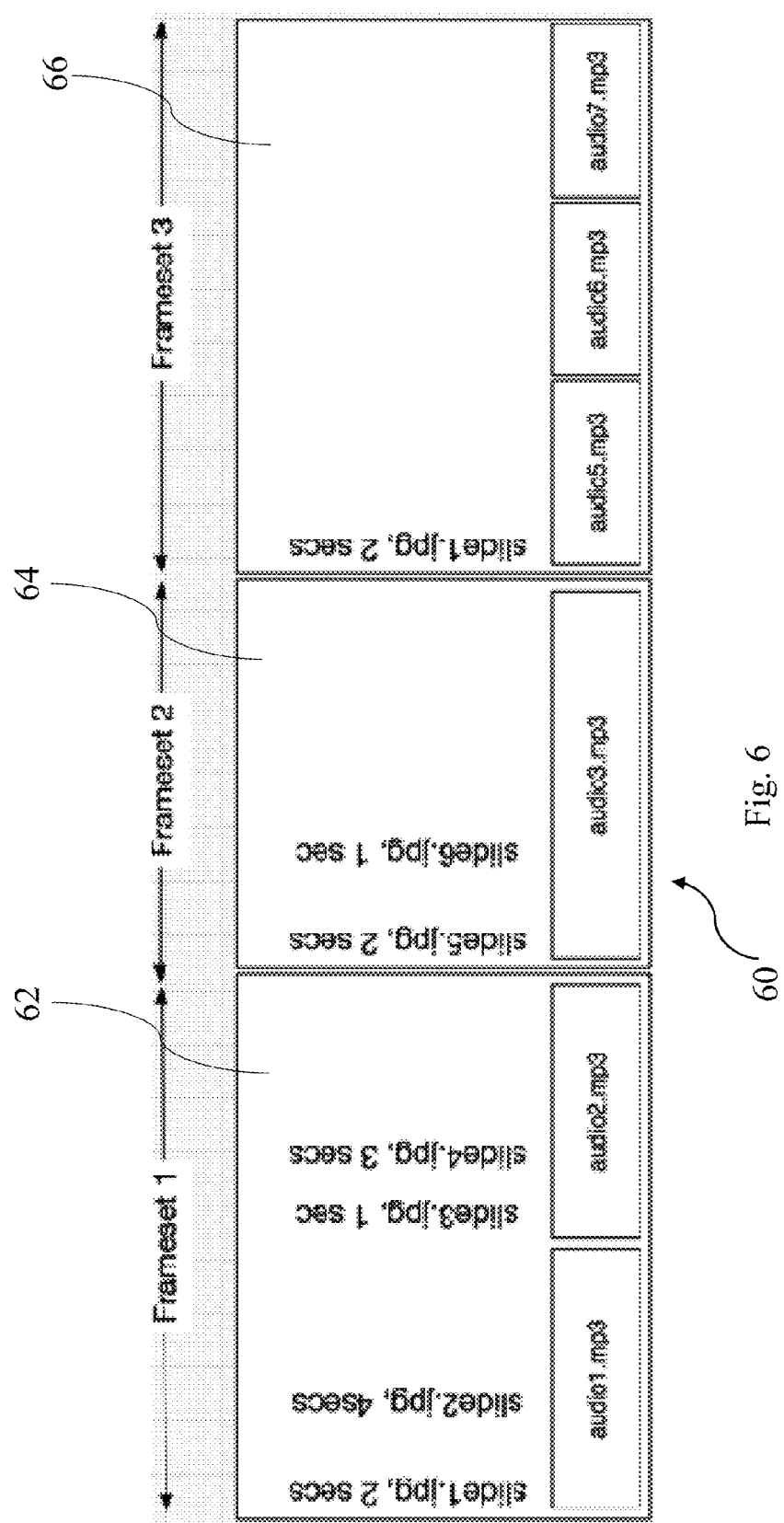
FIG. 6 is an illustration of a group of concatenated Frames.

A group 60 of concatenated Frames is shown in FIG. 6. The group 60 includes a first frame 62, a second frame 64, and a third frame 66. The first frame 62 includes two audio files, audio1 and audio2. The first frame 62 also includes four slides, slide1, slide2, slide3, and slide4. As can be seen, a time duration is specified/provided for each slide. This information is the length of time that each of the individual slides should be displayed. This helps to synchronize the slides to the audio. The second frame 64 includes one audio file (audio3) and two slides (slide5 and slide6). The third frame 66 includes three audio files (audio5, audio6, and audio7) and one slide (slide1).

As can be seen, a Frame may contain many slides and many audio files, many slides and one audio file, or one slide and many audio files. One of the advantages of dividing the presentation into Frames is that it allows for the construction of the final presentation by constructing a number of smaller sections. Because the included audio files are not predetermined (meaning they are largely created dynamically, so as to include certain user data), having frames greatly simplifies the syncing of the frames with the audio track, since the first slide of a frame will always appear at the very beginning of that frame.

Note that the length of each frame is defined by the length of all the audio files in the audio track of that frame (i.e., and not by the slide timings). The slide timings merely denote when, during each given frame, the slide will appear. If there are slides whose timing exceeds the audio track (and hence the length of the frame set), they will not appear, nor will they lengthen the frame.

Figure 7:
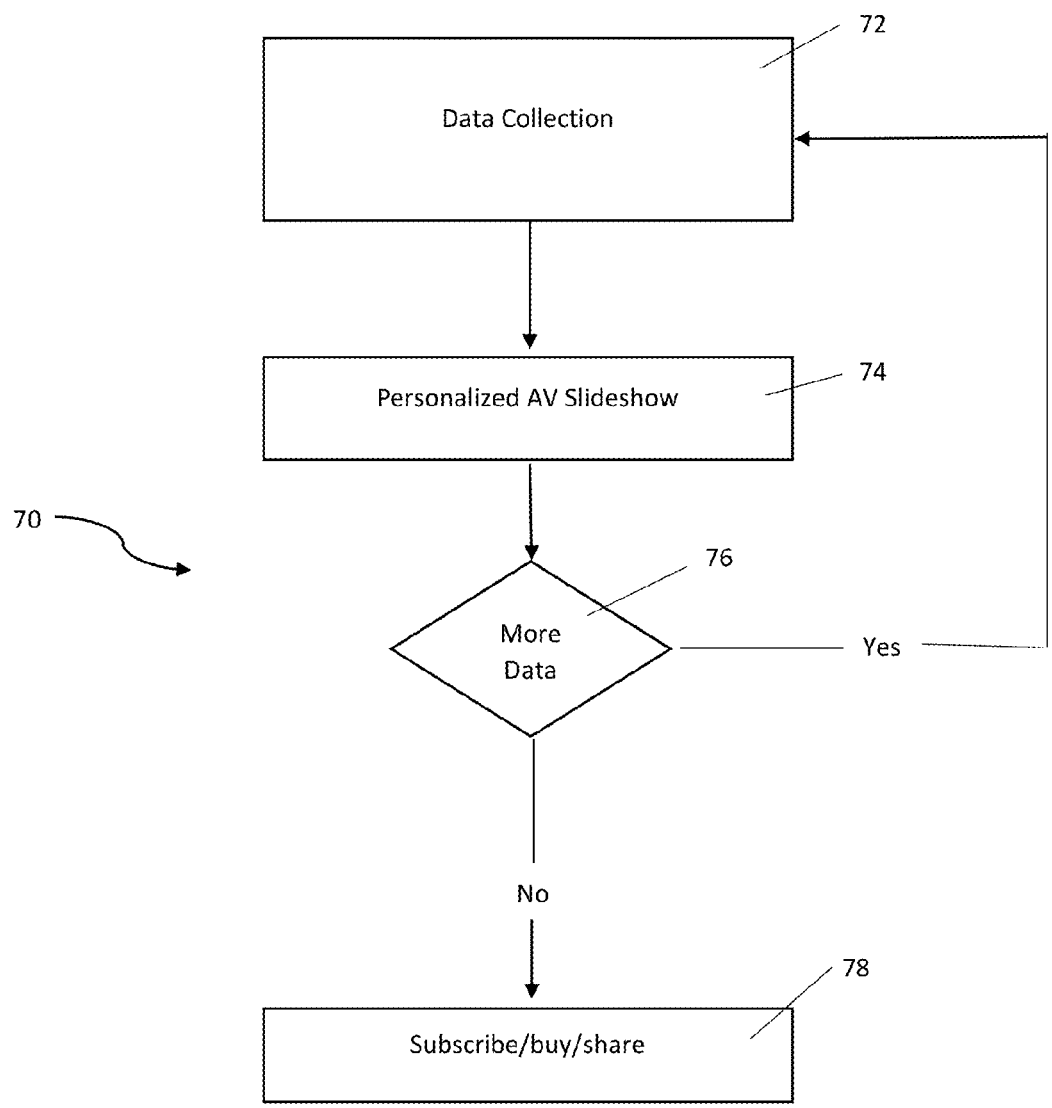
FIG. 7 is a flowchart showing visitor flow to a website.

This technology opens up new opportunities for visitor flow to a website. FIG. 7 shows one notable flow/process 70 that can be used. The process 70 begins with some basic data collection 72, either from user-supplied data (such as data entered via a form on a web page), or from previously stored data (e.g. data previously stored about the user, retrieved from a database). From here, this data is used to create 74 a completely personalized slide-presentation, with accompanying audio (which, for all intents and purposes, looks just like a video presentation). Subsequently, it may be determined 76 that more data should be obtained from the user. In such case, the process flow 70 returns to the data collection operation 72. On the other hand, if it is not determined 76 that more data should be obtained, the flow 70 can pass to a subscribe/buy/share operation 78 in which the user may have the option to enroll, purchase, and so forth.

Figure 8:
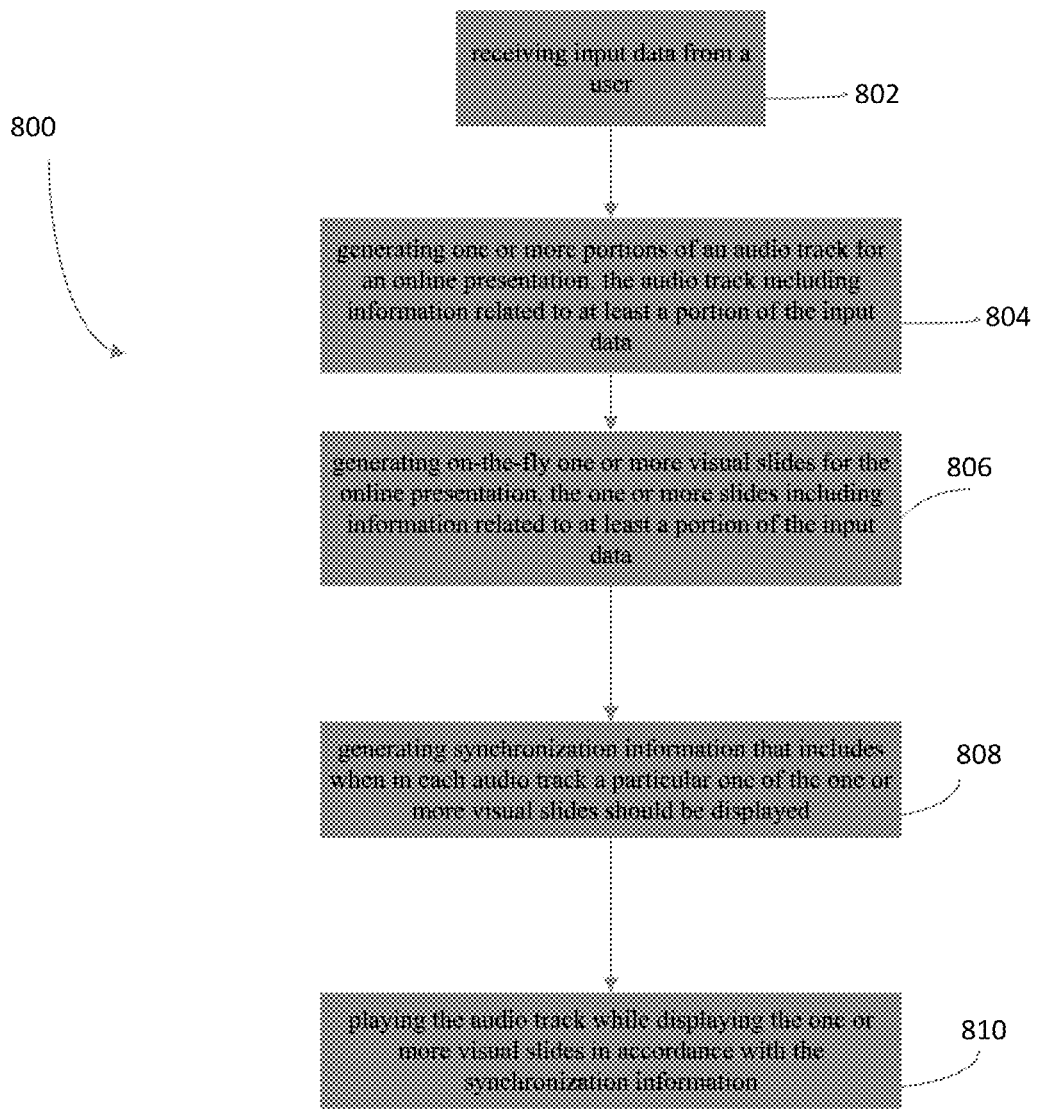
FIG. 8 is a flowchart of a method for generating and playing online presentations.

The following are some flowcharts of some of the processes disclosed herein. FIG. 8 shows a method 800 for generating and playing online presentations. The method 800 includes receiving 802 input data from a user; after receiving the input data, generating 804 one or more portions of an audio track for an online presentation, the audio track including information related to at least a portion of the input data; after receiving the input data, generating 806 on-the-fly one or more visual slides for the online presentation, the one or more slides including information related to at least a portion of the input data; after receiving the input data, generating 808 synchronization information that includes when in each audio track a particular one of the one or more visual slides should be displayed; and playing 810 the audio track while displaying the one or more visual slides in accordance with the synchronization information.

Figure 9:
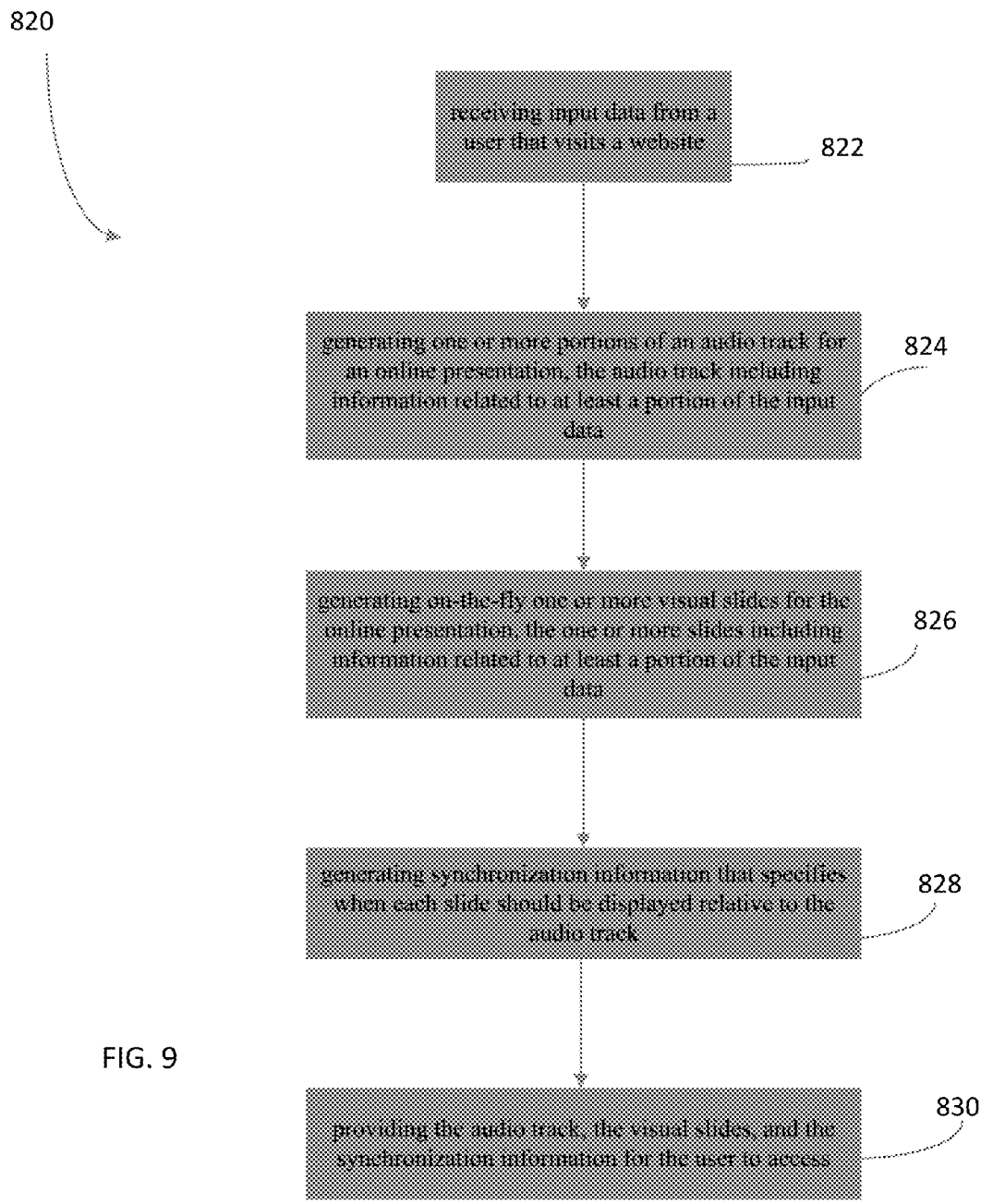
FIG. 9 is a flowchart of a method for generating online presentations.

FIG. 9 shows the methodology from the point of view of the website server. It is directed to a method 820 for generating online presentations. The method 820 includes receiving 822 input data from a user that visits a website; after receiving the input data, generating 824 one or more portions of an audio track for an online presentation, the audio track including information related to at least a portion of the input data; after receiving the input data, generating 826 on-the-fly one or more visual slides for the online presentation, the one or more slides including information related to at least a portion of the input data; generating 828 synchronization information that specifies when each slide should be displayed relative to the audio track; and providing 830 the audio track, the visual slides, and the synchronization information for the user to access.

Figure 10:
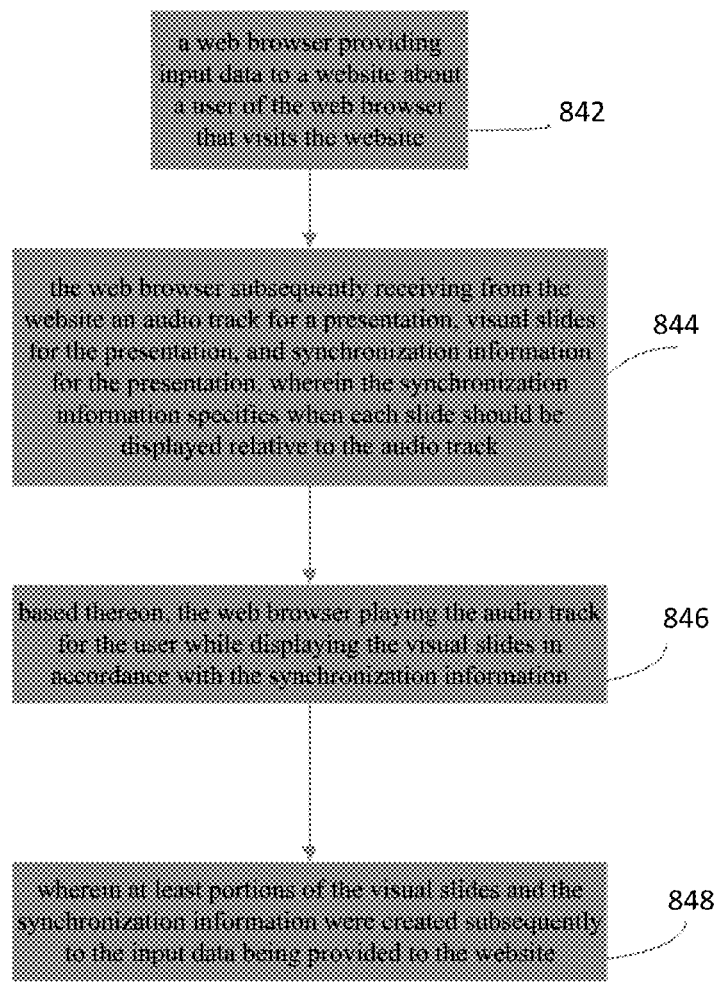
FIG. 10 is a flowchart of a method for playing back online presentations.

FIG. 10 shows the methodology from the point of view of the user and the user's computer. It is directed to a method 840 for playing back online presentations. The method 840 includes a web browser providing 842 input data to a website about a user of the web browser that visits the website; the web browser subsequently receiving 844 from the website an audio track for a presentation, visual slides for the presentation, and synchronization information for the presentation, wherein the synchronization information specifies when each slide should be displayed relative to the audio track; and based thereon, the web browser playing 846 the audio track for the user while displaying the visual slides in accordance with the synchronization information. At least portions of the visual slides and the synchronization information were created subsequently 848 to the input data being provided to the website.

Figure 11:
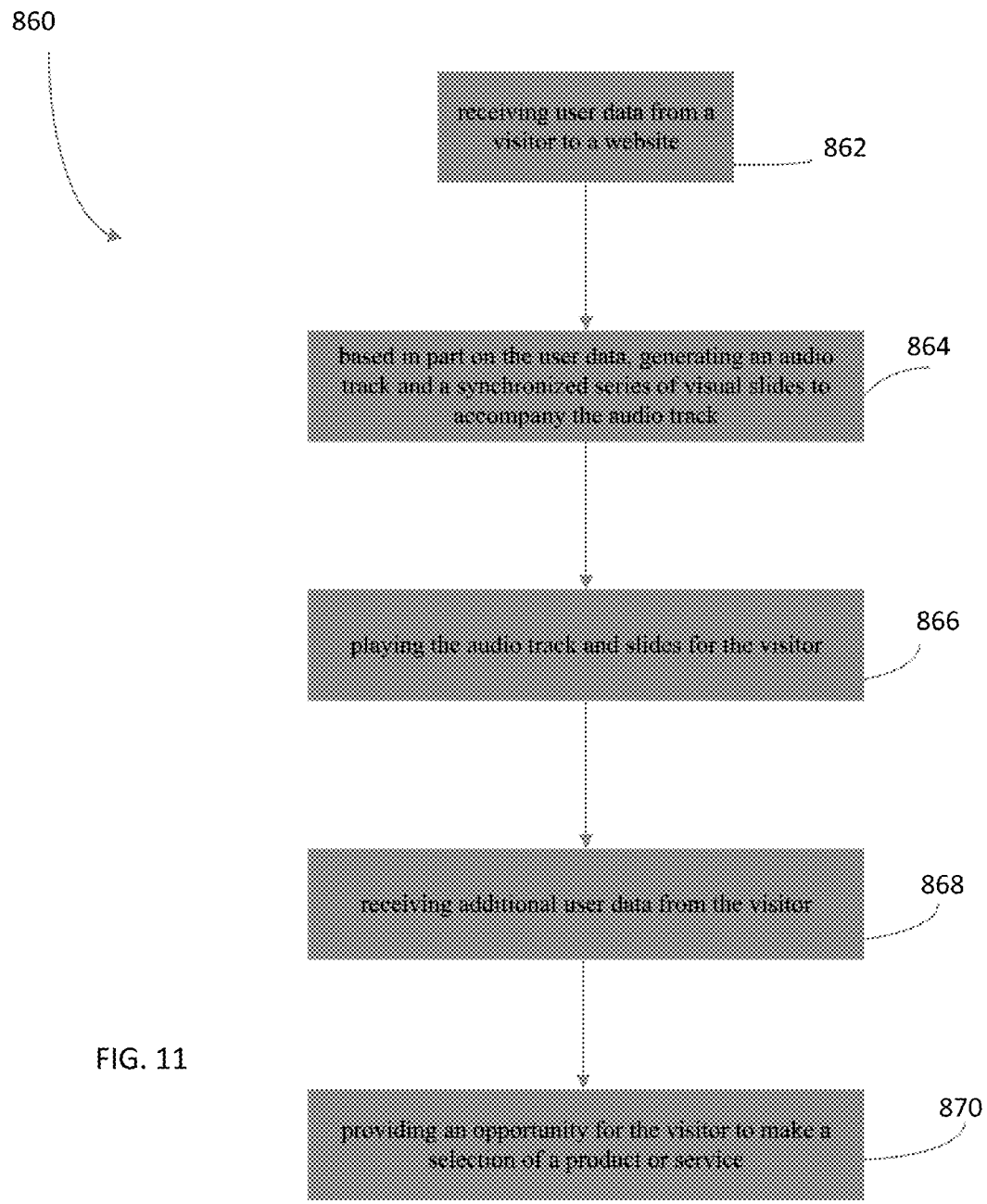
FIG. 11 is a flowchart of a method for interacting with a visitor to a website.

FIG. 11 is directed to a method 860 for interacting with a visitor to a website. The method 860 includes receiving 862 user data from a visitor to a website; based in part on the user data, generating 864 an audio track and a synchronized series of visual slides to accompany the audio track; playing 866 the audio track and slides for the visitor; receiving 868 additional user data from the visitor; and providing 870 an opportunity for the visitor to make a selection of a product or service.

The system described above improves on the practice of creating and streaming video presentations, since each slide in the presentation is sent through as an individual image file (i.e. a series of images are transferred from the server to the user's computer, at a rate of perhaps one slide every 1-2 seconds, rather than video at 24 frames per second). Nevertheless, as advantageous as this is (in terms of reduced bandwidth requirements, when compared to say an mp4 video file), each slide image sent to the user still takes up many tens of kilobytes, whereas the information contained on the slides (i.e. the actual words) could be conveyed much more efficiently.

Therefore, the system has alternatively been refined so that the client machine is able to generate the required images/text itself (by automatically downloading a javascript library containing all the necessary slide creation functionality), rather than having the server create and stream images. This means that to generate a slide that says for example, "Hello Anna, and Welcome Back," it is no longer necessary to transfer an entire image (GIF, JPG, etc.) from the server to the client computer; all that really needs to be transmitted are the actual words of text, and basic formatting information.

The client computer could then receive this information and create the slides, at least for those slides containing just text or basic vector graphics. However, for more complex images (where it is not practical for such images to be rendered through an automatically-downloaded Javascript library), and for photos or pre-rendered images, the system could use the previous method (i.e. streaming the image from the server to the client).

Figure 28:
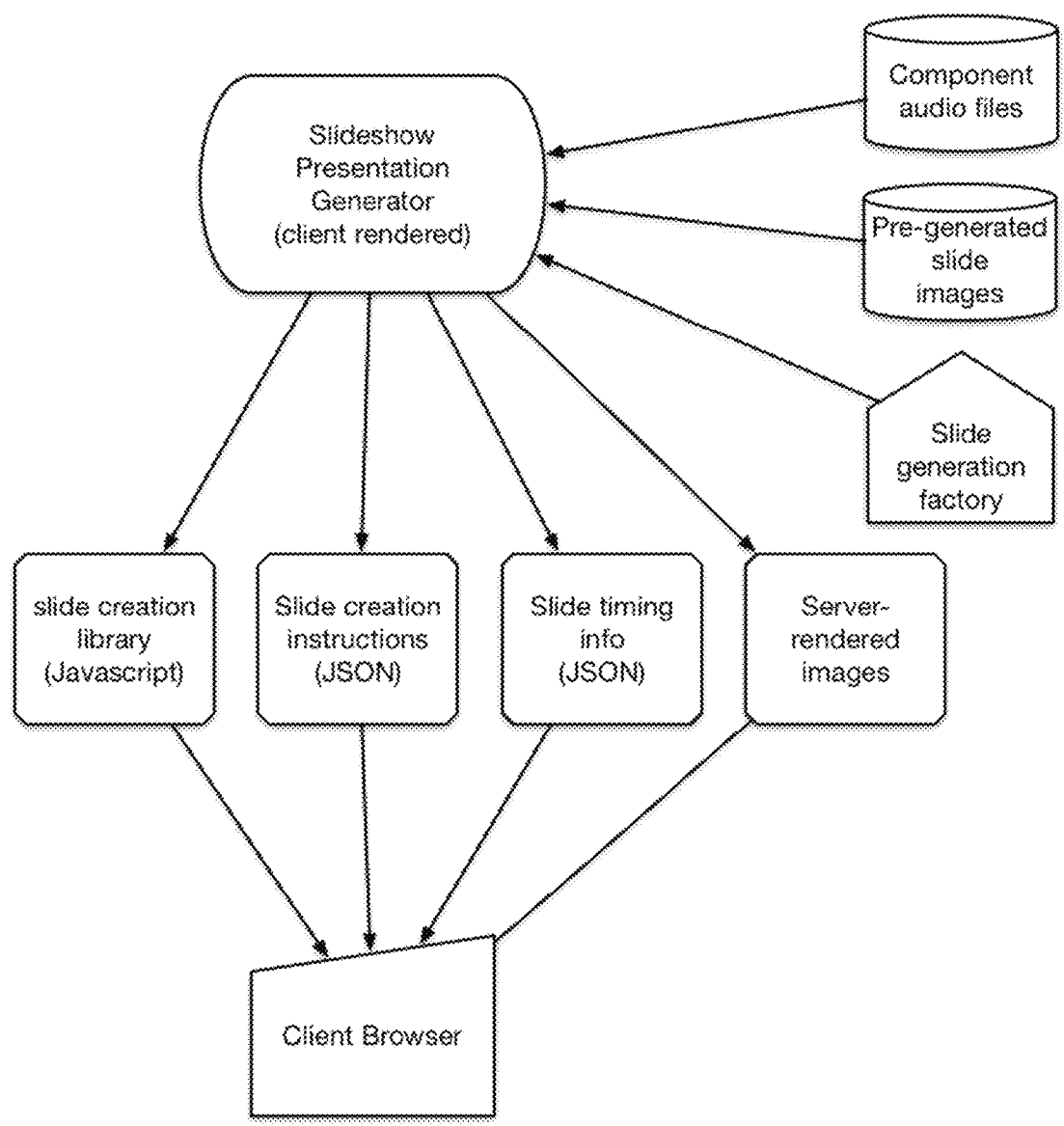
FIG. 28 is a generalized and simplified illustration of the techniques for presenting the slideshow and accompanying audio track, in the instance where slide creation and timing details are streamed from the server to the client, and the client renders the slides according to these details.

A generalized and simplified illustration of the system for creating the slideshow and accompanying audio track are provided in FIG. 28. A system includes a slideshow presentation generator (client rendered), which receives component audio files that have been stored in memory, pre-generated slide images that have been stored in memory, and slides from a slide generation factory. With these various inputs, the slideshow presentation generator generates and provides a slide creation library (e.g., in Javascript), slide creation instructions (e.g., in Javascript Object Notation (JSON)), slide timing information (e.g., in JSON), and server-rendered images. This is all provided to the client's web browser. While specifics such as Javascript and JSON have been mentioned, they are only examples and other suitable languages and formats could be used as well.

The primary benefit of this improved method is not just reduced bandwidth, even though this is certainly advantageous. Rather, the benefit is dramatically increased performance, particular over relatively slow networks (e.g. mobile devices outside 4G coverage areas). To watch a streamed video presentation under these circumstances is simply not feasible; however it works exceedingly well with the aforementioned improvement.

Instead, slides can be generated on the client under the direction of instructions provided by the server, perhaps best illustrated by example:

```
$slideshow->addCenteredTextSet(
  [ 1.3, "Over the next few minutes,"],
  [ 3, "I'm going to give you a quick yet <red>deeply revealing</red> analysis"],
  [ 2.1, "of your unique Numerology Chart" ],
  [ NULL, "based on your\n<b>given name </b>($firstName)\nand <b>date of birth</b>\n($monthName $dayNum, $yearNum)" ]
  //In the last record we omit the $time argument, this means the slide will be shown until the end of the frame
);
```

Figure 12:
FIG. 12 is an example of a slide that might be generated.
Figure 13:
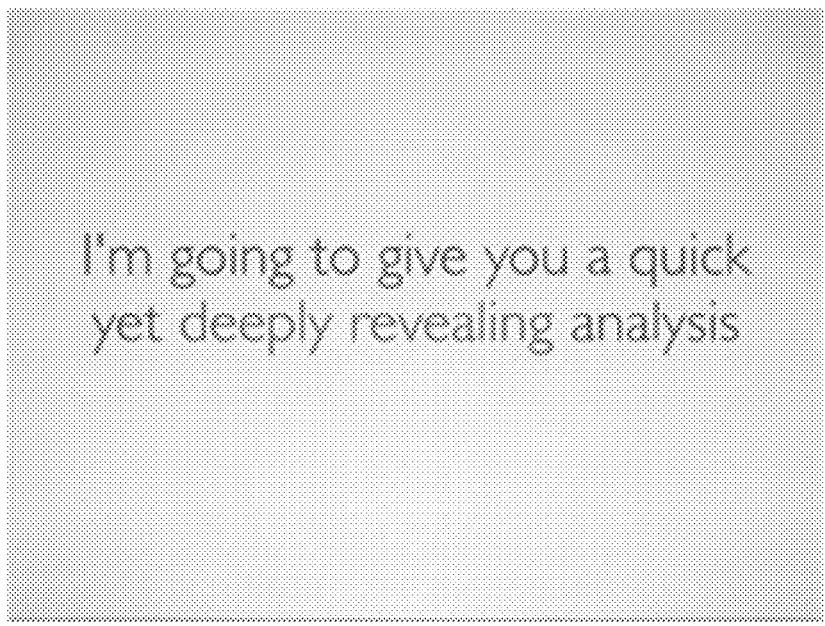
FIG. 13 is an example of a slide that might be generated.
Figure 14:
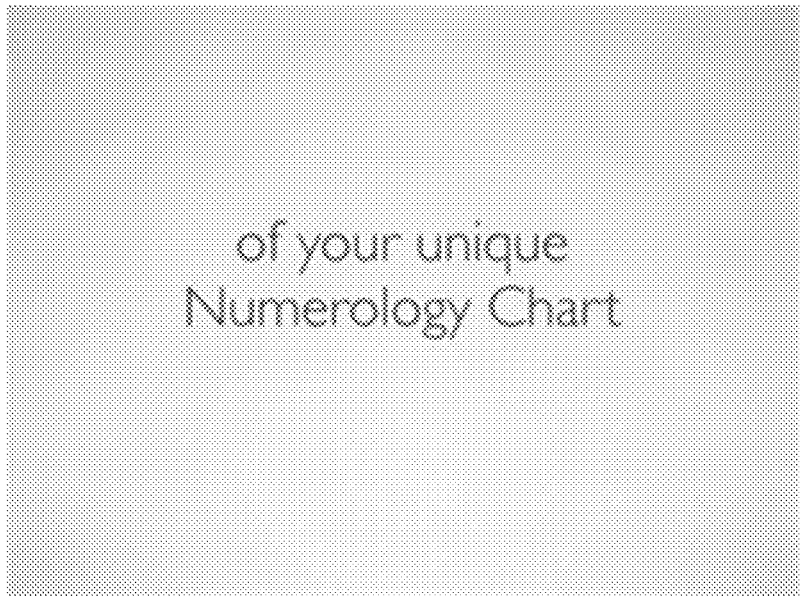
FIG. 14 is an example of a slide that might be generated.
Figure 15:
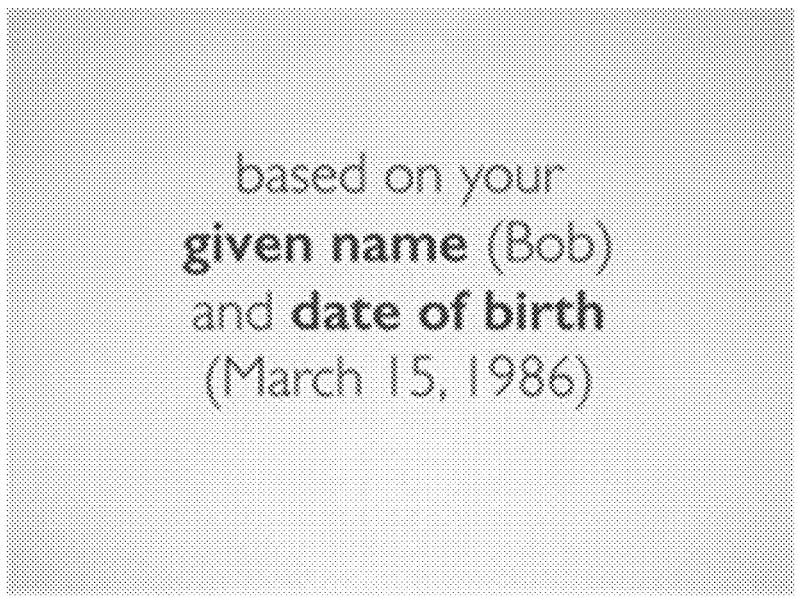
FIG. 15 is an example of a slide that might be generated.

In this example, the following slides are shown in succession: first the slide of FIG. 12 is shown for 1.3 seconds; next, the slide of FIG. 13 is shown for 3 seconds; next, the slide of FIG. 14 is shown for 2.1 seconds; next, the slide of FIG. 15 is shown until the end of the currently playing audio file. The duration of the display of each slide can be selected to at least roughly match the timing of the slides with the timing of the words being spoken in the accompanying voiceover track. The duration could also be selected based on the end of a bar or other section of music, based on a particular sound effect, or other.

Likewise, there is a similar method for creating a progressively appearing set of bullet points.

For example,

```
$slideshow->clear( )->setFontSize(30,'pt')->addSlideBullets(
  [1.18, "Your <b>Life Path</b>"],
  [1.18, "Your <b>Birthday</b> number"],
  [1.18, "Your <b>Soul Urge</b>"],
  [1.4, "Your <b>Expression</b>"],
  [1.90, "Your <b>Personality</b> number"]
);
```

Figure 16:
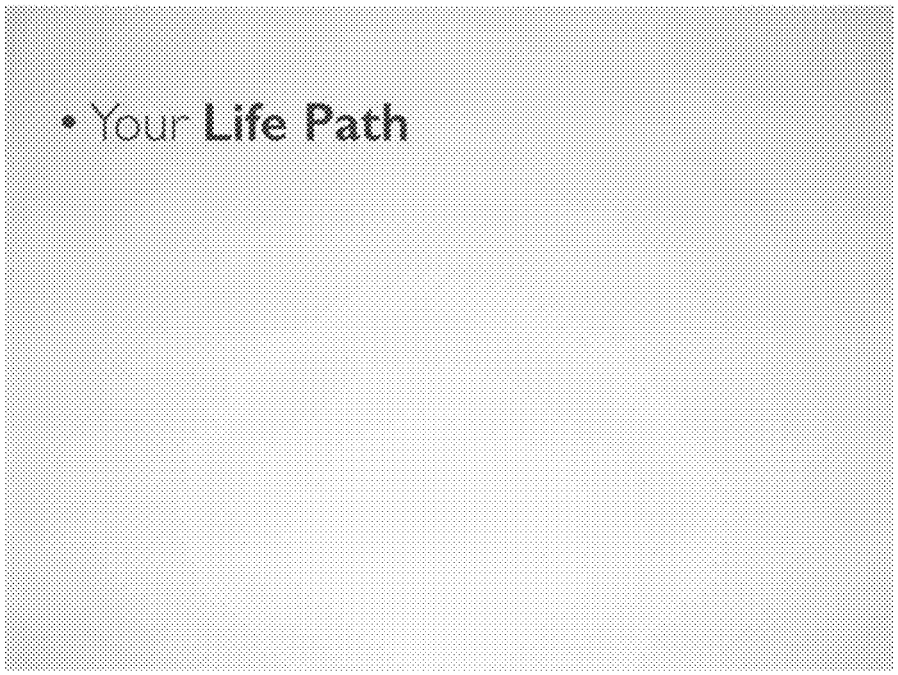
FIG. 16 is an example of a slide that might be generated.
Figure 17:
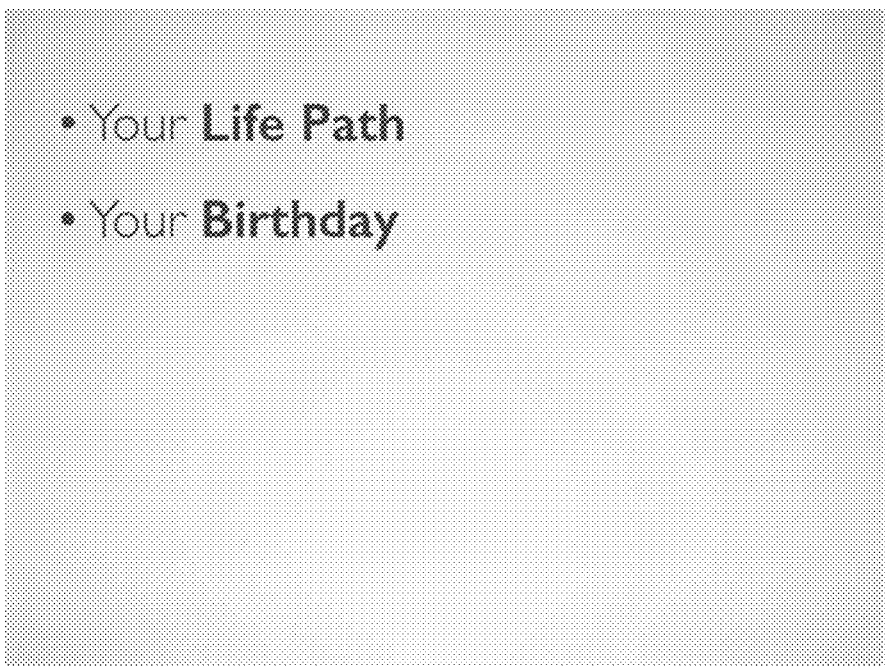
FIG. 17 is an example of a slide that might be generated.
Figure 18:
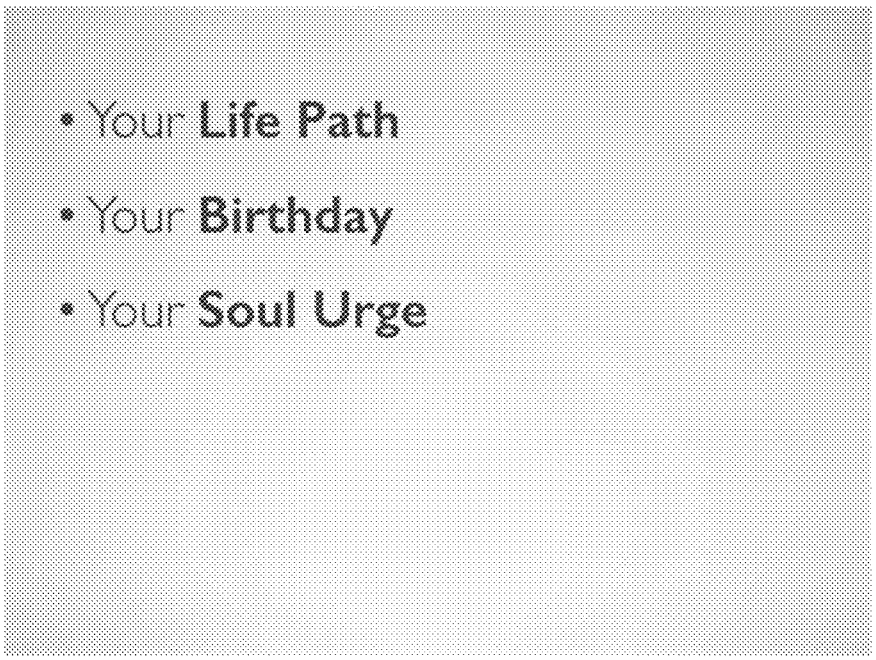
FIG. 18 is an example of a slide that might be generated.
Figure 19:
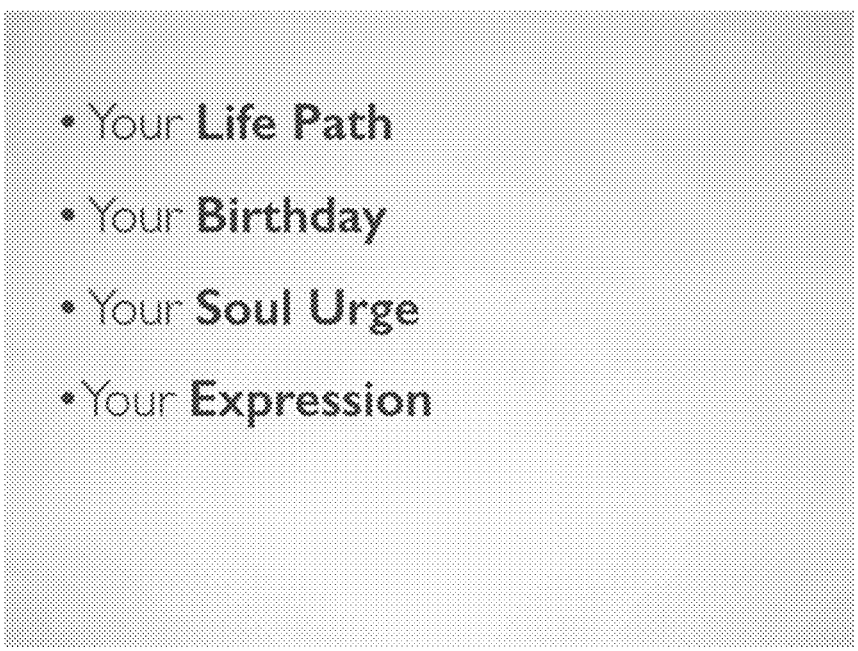
FIG. 19 is an example of a slide that might be generated.
Figure 20:
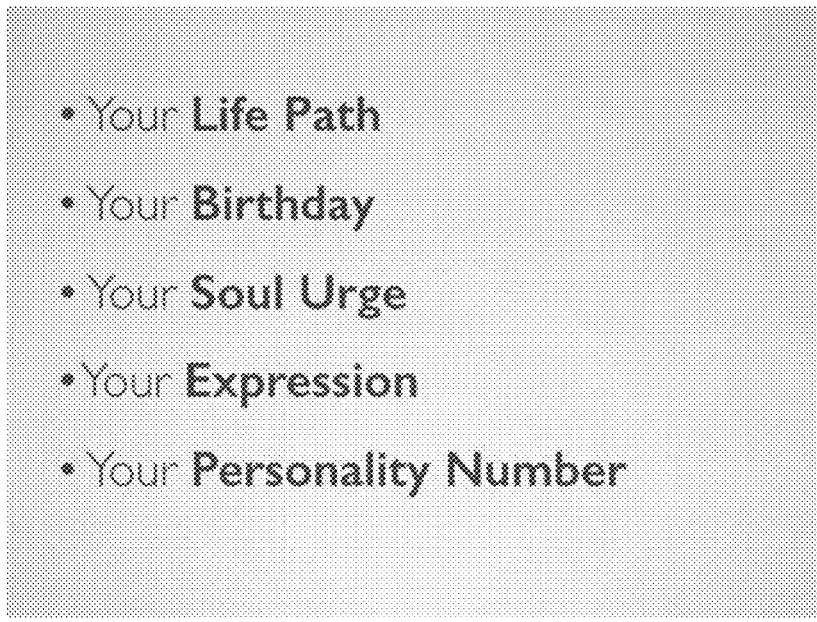
FIG. 20 is an example of a slide that might be generated.

This would create the following set of slides on the client machine: first, the slide of FIG. 16 is shown for 1.18 seconds; next, the slide of FIG. 17 is shown for 1.18 seconds; next, the slide of FIG. 18 is shown for 1.18 seconds; next, the slide of FIG. 19 is shown for 1.4 seconds; and next, the slide of FIG. 20 is shown for 1.9 seconds.

This could be followed by a numerology reading. For example,

```
$slideshow->addSlide(6); //Add empty slide with 6 sec duration
$slideshow->setFontSize(30, "pt"); // Default is px, if we ned use other, just pass it in second argument
$slideshow->setTitle("Numerology Reading\n for <b>$firstName</b>\n Born \n<b><red>$monthName $dayNum, $yearNum</red></b>.");
$slideshow->addBirthTiles( $yearNum , $monthNum, $dayNum );
```

Figure 21:
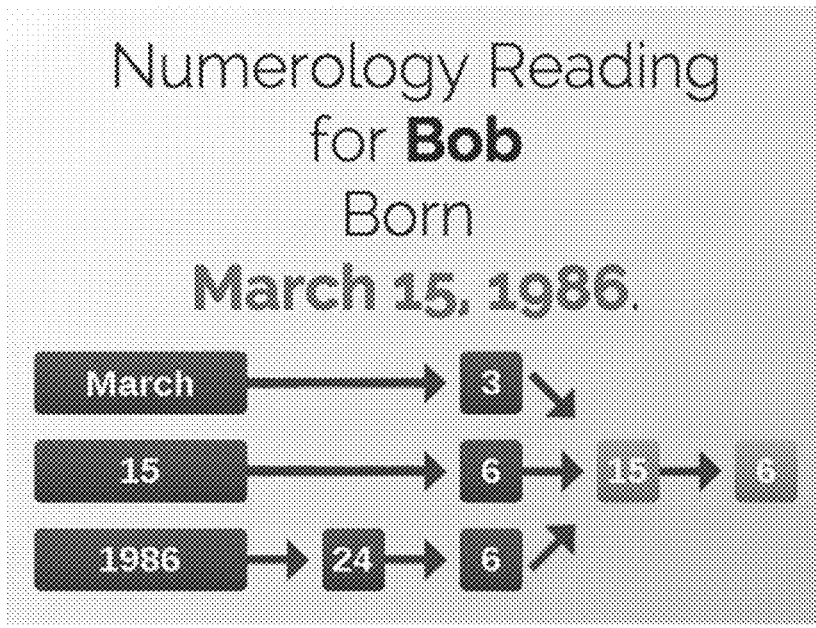
FIG. 21 is an example of a slide that might be generated.

This results in the client machine rendering the slide of FIG. 21. With regard to everything above, it should be noted that when reference is made to a "client computer" or "client machine", this might equally well include a tablet, phone, or other mobile device.

One particularly advantageous aspect of the above is the overlaying of personalized graphics onto a presentation (rendered either on the client or the server, and overlaid on top of either a video, or a slide presentation). For example, a presentation that appears as a continuous video to a user may include portions thereof that are generic to a number of presentations to different users and it may also include one or more portions thereof that are specific to a that particular user. In the case of providing a numerology analysis, certain portions with graphics could be overlaid on top of the video. As will be discussed, the overlaid graphics could be rendered at the server or at the user's computer. In addition, video splicing can be used to create a seamless presentation to cover all possible birthdates and the majority of possible first names.

Figure 29:
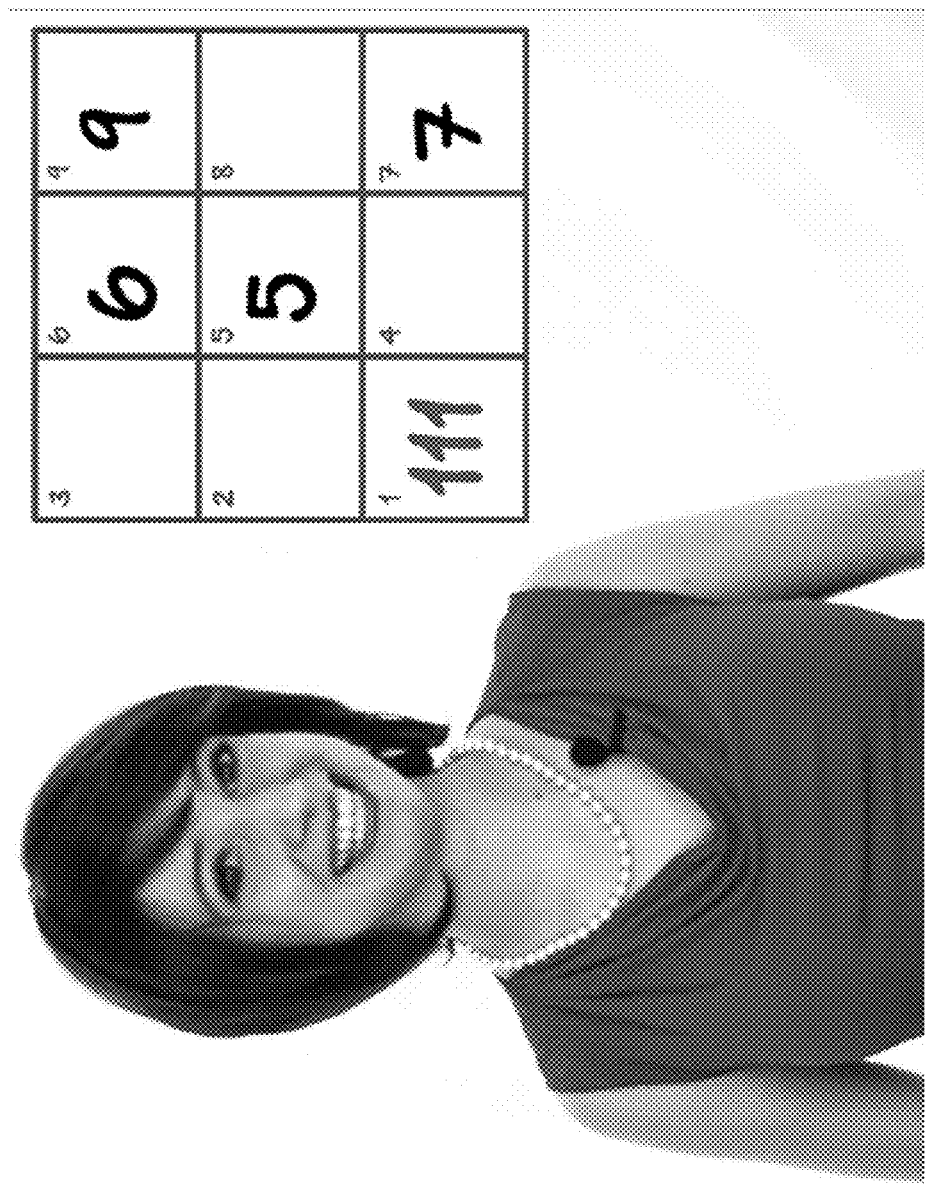
FIG. 29 is an illustration of graphics overlaid onto a pre-existing video.

This is illustrated in FIG. 29 in which a screenshot shows a model that is speaking as part of a video presentation. Portions of the video presentation may be unique to all users and portions of the video presentation may be unique to a particular user. Also shown is the overlaid graphics of a numerology chart which is specific to that particular user.

One unique aspect of this approach is how we specifically overlay personalized graphical elements over the top of the presentation. It can be done on the server or the graphics can be created on the client, enabling real-time personalization of video, without necessarily having to create/stream video that is unique to each user.

For example, we could have a single video streamed to multiple users, and by the addition of client-rendered personalized graphics over the top of that video, giving the appearance of a completely personalized video, unique to each user. We may also be splicing videos of actors talking into a camera—to create the impression of a personalized presentation similar to the video approach above.

Figure 22:
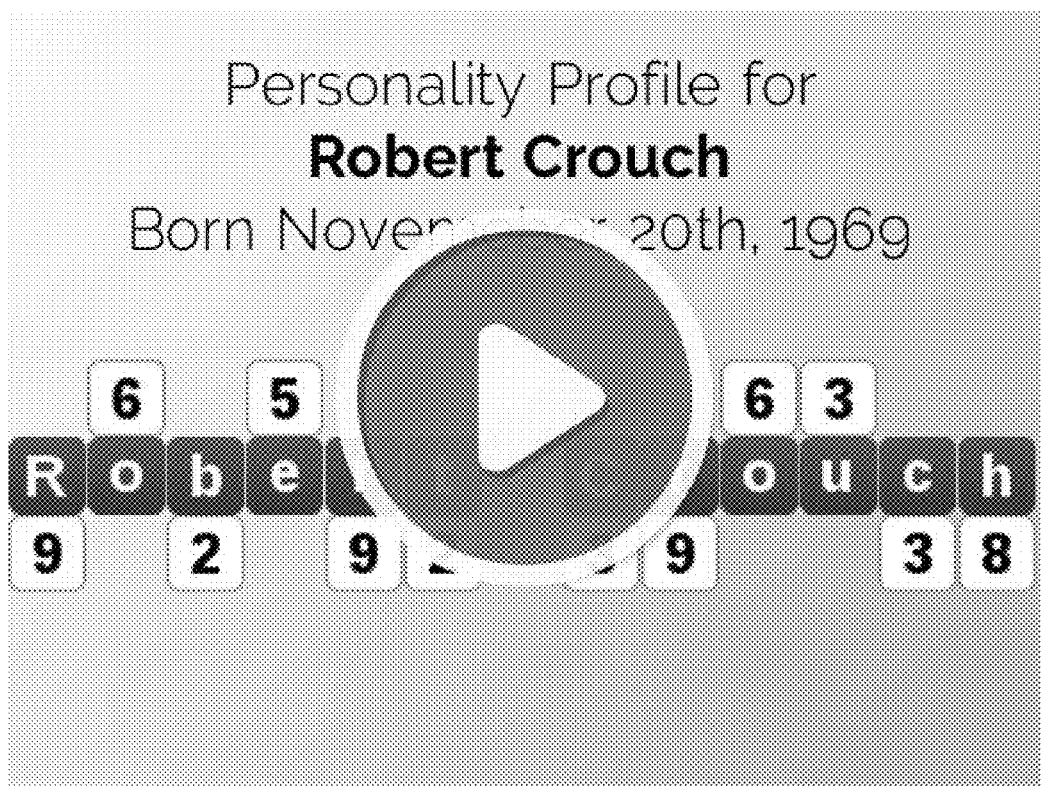
FIG. 22 is an example of a slide that might be generated.
Figure 23:
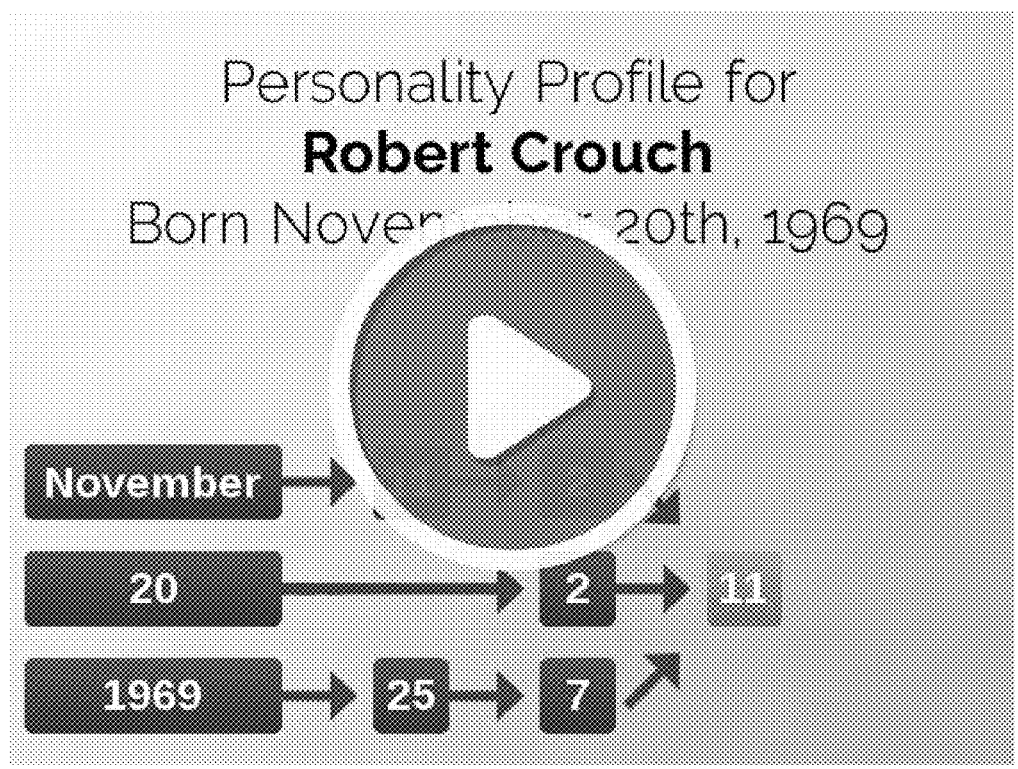
FIG. 23 is an example of a slide that might be generated.

Another alternative aspect would be to provide a personalized graphic within the body of an email sent to a user. A URL can be created that has the user's name and birthdate (or other personal information) embedded therein. When the user opens the email, including a reference to an image on our server at that URL (http://mytestingserver2.com/slides9-js/previews/nametiles-1969-11-20-Bob-Robert_Crouch.png), their email client retrieves and displays an image that looks like the slide of FIG. 22. When the user clicks on this URL (http://mytestingserver2.com/slides9-js/previews/nametiles-1969-11-20-Bob-Robert_Crouch.png), their browser plays the corresponding video of FIG. 23.

On the surface it appears like merely a couple of images have been created and uploaded, the images containing some personal details. However, if one changes the name (or date of birth) in the above URLs, to another name or date of birth, they will get a different slide (with different numerology values) that is dynamically created and displayed in the user's browser.

Accordingly, by collecting a user's data when they register at a website, we can not only show them a personalized video, but also show them a personalized graphic within the body of an email we send them, indicating the video that will be played. Specifically, it is immediately apparent to the user, when they open their email—by way of the video preview image contained in the email they receive—that the video is not a generic video, but is a video uniquely generated for, and specific to, that user. In a nutshell, they see a personalized preview image of their video, right in the email message they receive from us.

By making it evident to the user—even before they click a link in an email that the video is theirs and theirs alone—we are able to dramatically increase the percentage of users who click on the link to view the actual video (i.e. we profoundly increase our "click-through rate" from the email to the video).

We are not aware of anyone who has ever even seen a graphic created specifically for them in the body of an email. In our testing, this unique experience jars the attention of the user (creating what is known as a "pattern interrupt" in the user), the end result being a dramatically higher percentage of users taking the time to click the link on the email to view the corresponding email, compared with a "static" image which is the same for all users.

Figure 24:
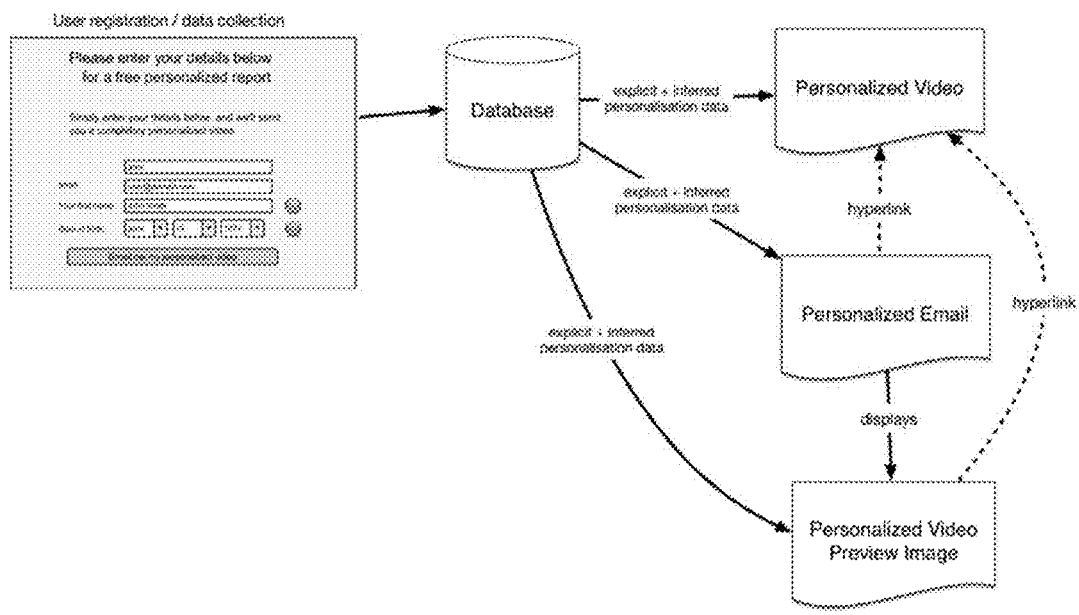
FIG. 24 is an illustration of data collection.
Figure 25:
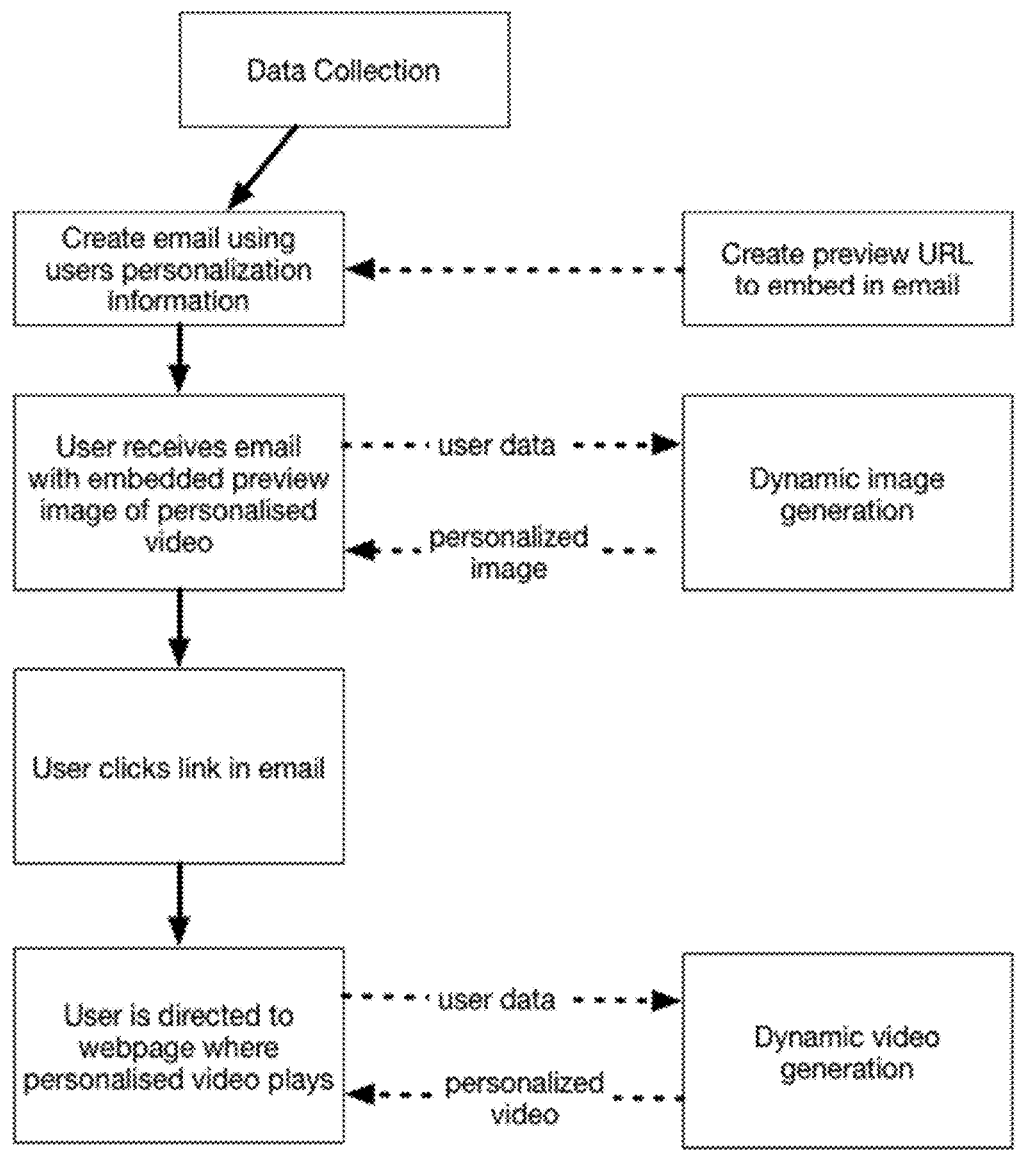
FIG. 25 is an example of a basic flow diagram.
Figure 26:
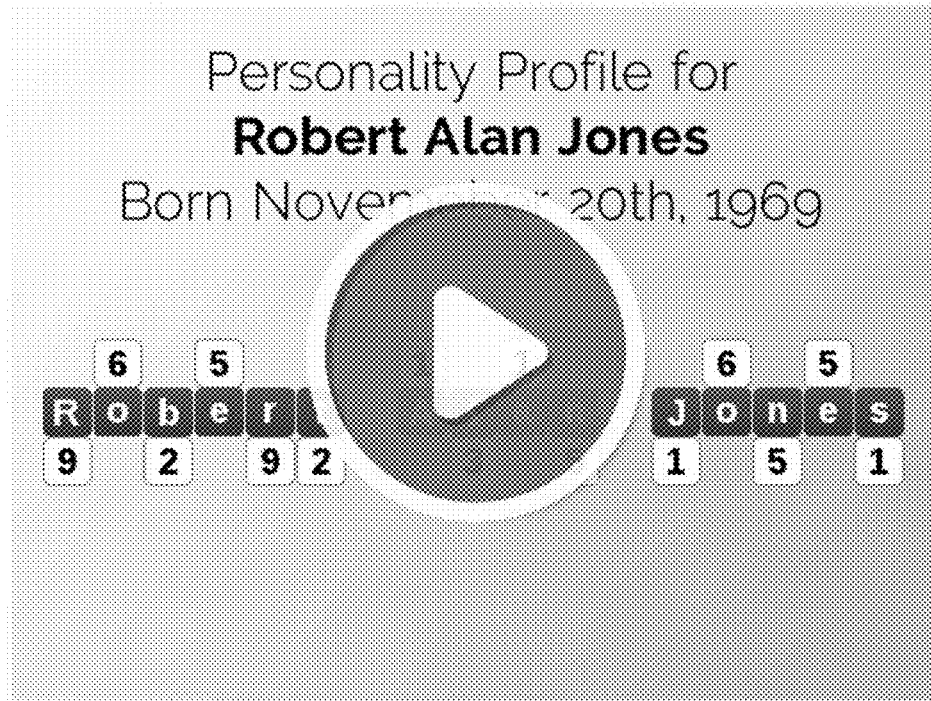
FIG. 26 is an example of an email that might be generated.
Figure 27:
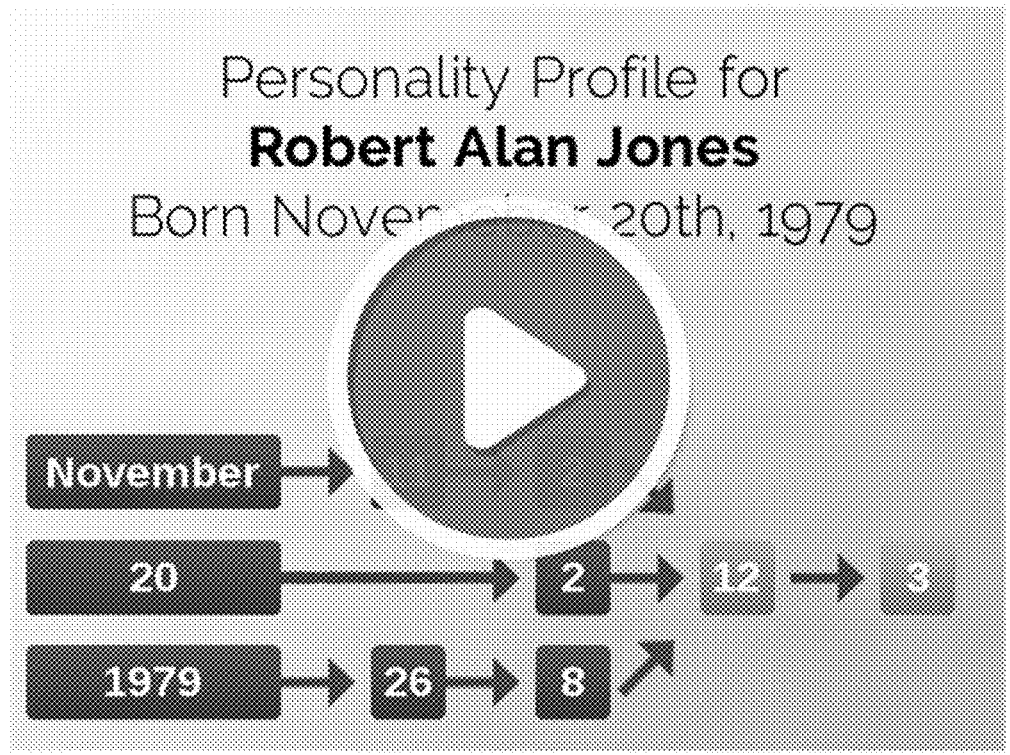
FIG. 27 is an example of an email that might be generated.

Please refer to the attached images: (1) a conceptual view of the data collection is shown in FIG. 24; (2) a basic flow diagram is shown in FIG. 25; and (3) screen-shots of two sample emails (FIGS. 26 and 27) as received by a user, containing not just their personalized information in the text of the email, but also within the image (which of course would link to a web page, where the corresponding personalized video would play).

Please note that while in this example we have used explicitly supplied user data (in this case, the birth name and date of birth as given), the same system can be used for implicitly derived user data, including buyer demographics and psychographics. For example, we have the user's date of birth, so from that can calculate their age. Likewise, with a name of, say, John, we can infer their gender by simply keeping lists of male and female names (we may ask for their gender in the case of a 'unisex' name, e.g. "Kerry", "Adrian"). This can be done by maintaining a very large list of male names, and a very large list of female names. If the name is in one list but not the other, we can infer their gender. If the name is in neither list (an unknown name), or both lists (a "unisex" name), we do not make the inference, and instead the user is explicitly asked their gender.

Likewise we may record or infer many other details about the user, for example their geographical location, their probable income range, and their buying preferences . . . and use this data to create a custom image for the user, based on this information (the image and associated video might include, say, a Porsche, if we know this is a motor vehicle that we know specifically appeals to them).

Method

The way this is accomplished is by having the web server examine the requested URL, and dynamically create an image, in accordance with the data it finds in the URL. Continuing with the current example, the URL:

http://www.domain.com/preview-1969-11-20-John-John-Smith.png can be considered more generally as:

http://www.domain.com/preview-{yyyy}-{mm}-{dd}-{firstname}-{birthname}.png

By constructing a link similar to the above in each email we send to the user (using data from our database), a completely unique preview image is seen by each user. (The syntax of the above can be easily modified to pass other types of user data.)

As can be appreciated, a variety of techniques have been disclosed and discussed herein. These include: (a) instead of streaming video to a user, providing a series of visual slides, an accompanying audio track, and synchronization information; (b) alternatively or additionally, providing text (and format information) and allowing the client computer to create the slide(s); (c) alternatively or additionally, overlaying personalized graphics onto a presentation (video or slides); and (d) alternatively or additionally, providing personalized graphics within the body of an email sent to a user.

At this point, methods and techniques for performing such computer-implemented methods will be discussed. Generally, the techniques disclosed herein may be implemented on any suitable hardware or any suitable combination of software and hardware. For example, they may be implemented in an operating system kernel, in a separate user process, in a library package bound into network applications, on a specially constructed machine, on an application-specific integrated circuit (ASIC), or other.

Software/hardware hybrid implementations of at least some of the embodiments disclosed herein may be implemented on a programmable network-resident machine (which should be understood to include intermittently connected network-aware machines) selectively activated or reconfigured by a computer program stored in memory. Such network devices may have multiple network interfaces that may be configured or designed to utilize different types of network communication protocols. A general architecture for some of these machines may be disclosed herein in order to illustrate one or more exemplary means by which a given unit of functionality may be implemented. According to specific embodiments, at least some of the features or functionalities of the various embodiments disclosed herein may be implemented on one or more general-purpose computers associated with one or more networks, such as for example an end-user computer system, a client computer, a network server or other server system, a mobile computing device (e.g., tablet computing device, mobile phone, smartphone, laptop, and the like), a consumer electronic device, a music player, or any other suitable electronic device, router, switch, or the like, or any combination thereof. In at least some embodiments, at least some of the features or functionalities of the various embodiments disclosed herein may be implemented in one or more virtualized computing environments (e.g., network computing clouds, virtual machines hosted on one or more physical computing machines, or the like).

Referring now to FIG. 1, there is shown a block diagram depicting an exemplary computing device 100 suitable for implementing at least a portion of the features or functionalities disclosed herein. Computing device 100 may be, for example, any one of the computing machines listed in the previous paragraph, or indeed any other electronic device capable of executing software- or hardware-based instructions according to one or more programs stored in memory. Computing device 100 may be adapted to communicate with a plurality of other computing devices, such as clients or servers, over communications networks such as a wide area network a metropolitan area network, a local area network, a wireless network, the Internet, or any other network, using known protocols for such communication, whether wireless or wired.

In one embodiment, computing device 100 includes one or more central processing units (CPU) 102, one or more interfaces 110, and one or more busses 106 (such as a peripheral component interconnect (PCI) bus). When acting under the control of appropriate software or firmware, CPU 102 may be responsible for implementing specific functions associated with the functions of a specifically configured computing device or machine. For example, in at least one embodiment, a computing device 100 may be configured or designed to function as a server system utilizing CPU 102, local memory 101 and/or remote memory 120, and interface(s) 110.

In at least one embodiment, CPU 102 may be caused to perform one or more of the different types of functions and/or operations under the control of software modules or components, which for example, may include an operating system and any appropriate applications software, drivers, and the like. CPU 102 may include one or more processors 103 such as, for example, a processor from one of the Intel, ARM, Qualcomm, and AMD families of microprocessors. In some embodiments, processors 103 may include specially designed hardware such as application-specific integrated circuits (ASICs), electrically erasable programmable read-only memories (EEPROMs), field-programmable gate arrays (FPGAs), and so forth, for controlling operations of computing device 100. In a specific embodiment, a local memory 101 (such as non-volatile random access memory (RAM) and/or read-only memory (ROM), including for example one or more levels of cached memory) may also form part of CPU 102. However, there are many different ways in which memory may be coupled to system 100. Memory 101 may be used for a variety of purposes such as, for example, caching and/or storing data, programming instructions, and the like.

As used herein, the term "processor" is not limited merely to those integrated circuits referred to in the art as a processor, a mobile processor, or a microprocessor, but broadly refers to a microcontroller, a microcomputer, a programmable logic controller, an application-specific integrated circuit, and any other programmable circuit.

In one embodiment, interfaces 110 are provided as network interface cards (NICs). Generally, NICs control the sending and receiving of data packets over a computer network; other types of interfaces 110 may for example support other peripherals used with computing device 100. Among the interfaces that may be provided are Ethernet interfaces, frame relay interfaces, cable interfaces, DSL interfaces, token ring interfaces, graphics interfaces, and the like. In addition, various types of interfaces may be provided such as, for example, universal serial bus (USB), Serial, Ethernet, Firewire™, PCI, parallel, radio frequency (RF), Bluetooth™ near-field communications (e.g., using near-field magnetics), 802.11 (WiFi), frame relay, TCP/IP, ISDN, fast Ethernet interfaces, Gigabit Ethernet interfaces, asynchronous transfer mode (ATM) interfaces, high-speed serial interface (HSSI) interfaces, Point of Sale (POS) interfaces, fiber data distributed interfaces (FDDIs), and the like. Generally, such interfaces 110 may include ports appropriate for communication with appropriate media. In some cases, they may also include an independent processor and, in some in stances, volatile and/or non-volatile memory (e.g., RAM).

Although the system shown in FIG. 1 illustrates one specific architecture for a computing device 100 for implementing one or more of the embodiments described herein, it is by no means the only device architecture on which at least a portion of the features and techniques described herein may be implemented. For example, architectures having one or any number of processors 103 may be used, and such processors 103 may be present in a single device or distributed among any number of devices. In one embodiment, a single processor 103 handles communications as well as routing computations, while in other embodiments a separate dedicated communications processor may be provided. In various embodiments, different types of features or functionalities may be implemented in a system that includes a client device (such as a tablet device or smartphone running client software) and server systems (such as a server system described in more detail below).

Regardless of network device configuration, the system may employ one or more memories or memory modules (such as, for example, remote memory block 120 and local memory 101) configured to store data, program instructions for the general-purpose network operations, or other information relating to the functionality of the embodiments described herein (or any combinations of the above). Program instructions may control execution of or comprise an operating system and/or one or more applications, for example. Memory 120 or memories 101, 120 may also be configured to store data structures, configuration data, encryption data, historical system operations information, or any other specific or generic non-program information described herein.

Because such information and program instructions may be employed to implement one or more systems or methods described herein, at least some network device embodiments may include nontransitory machine-readable storage media, which, for example, may be configured or designed to store program instructions, state information, and the like for performing various operations described herein. Examples of such nontransitory machine-readable storage media include, but are not limited to, magnetic media such as hard disks, floppy disks, and magnetic tape; optical media such as CD-ROM disks; magneto-optical media such as optical disks, and hardware devices that are specially configured to store and perform program instructions, such as read-only memory devices (ROM), flash memory, solid state drives, memristor memory, random access memory (RAM), and the like. Examples of program instructions include both object code, such as may be produced by a compiler, machine code, such as may be produced by an assembler or a linker, byte code, such as may be generated by for example a Java™ compiler and may be executed using a Java virtual machine or equivalent, or files containing higher level code that may be executed by the computer using an interpreter (for example, scripts written in Python, Perl, Ruby, Groovy, or any other scripting language).

Figure 2:
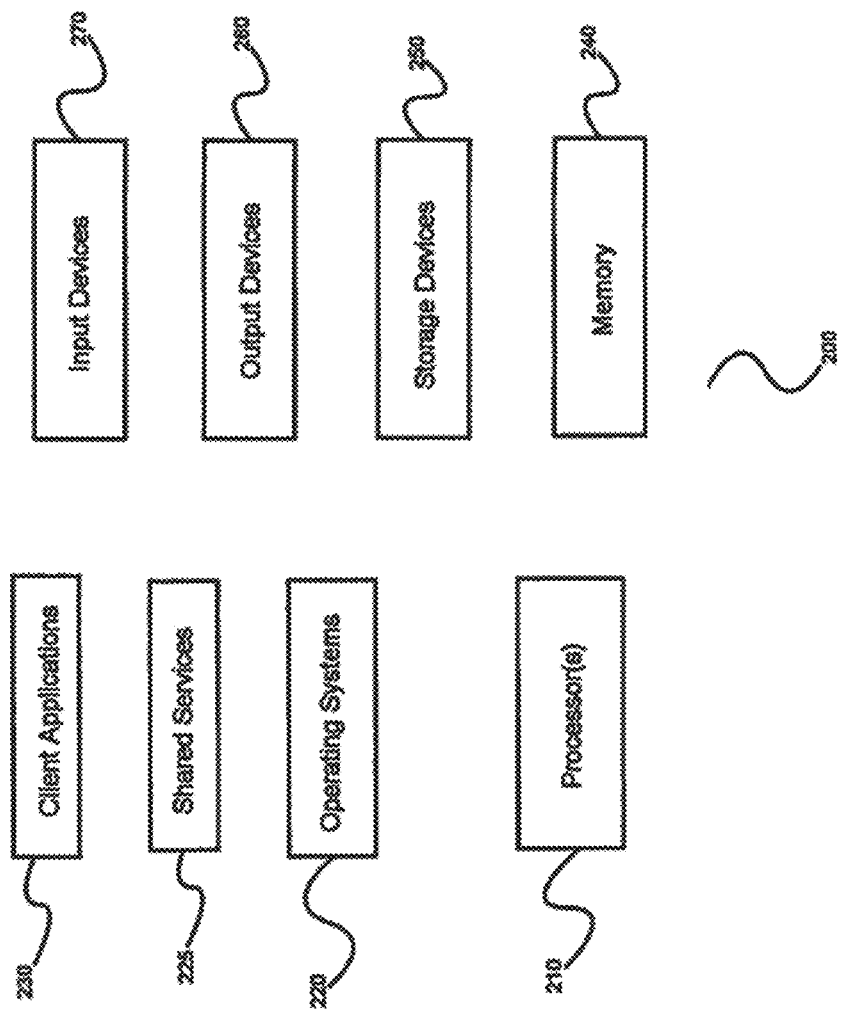
FIG. 2 is a block diagram illustrating an exemplary logical architecture for a client device, according to an embodiment of the disclosure herein.

In some embodiments, systems may be implemented on a standalone computing system. Referring now to FIG. 2, there is shown a block diagram depicting a typical exemplary architecture of one or more embodiments or components thereof on a standalone computing system. Computing device 200 includes processors 210 that may run software that carry out one or more functions or applications of embodiments, such as for example a client application 230. Processors 210 may carry out computing instructions under control of an operating system 220 such as, for example, a version of Microsoft's Windows™ operating system, Apple's Mac OS/X or iOS operating systems, some variety of the Linux operating system, Google's Android™ operating system, or the like. In many cases, one or more shared services 225 may be operable in system 200, and may be useful for providing common services to client applications 230. Services 225 may for example be Windows™ services, user-space common services in a Linux environment, or any other type of common service architecture used with operating system 210. Input devices 270 may be of any type suitable for receiving user input, including for example a keyboard, touchscreen, microphone (for example, for voice input), mouse, touchpad, trackball, or any combination thereof. Output devices 260 may be of any type suitable for providing output to one or more users, whether remote or local to system 200, and may include for example one or more screens for visual output, speakers, printers, or any combination thereof. Memory 240 may be random-access memory having any structure and architecture known in the art, for use by processors 210, for example to run software. Storage devices 250 may be any magnetic, optical, mechanical, memristor, or electrical storage device for storage of data in digital form. Examples of storage devices 250 include flash memory, magnetic hard drive, CD-ROM, and/or the like.

Figure 3:
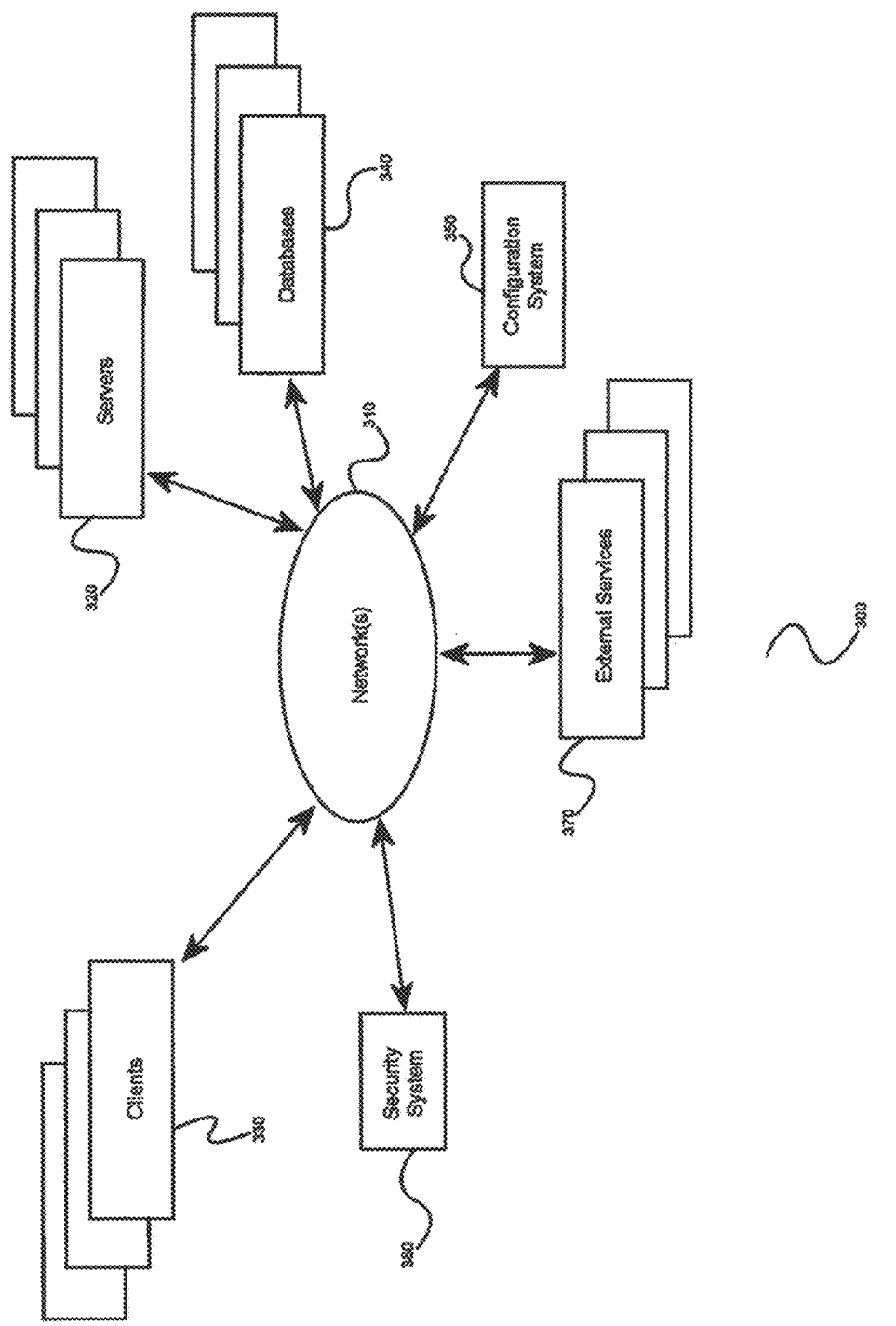
FIG. 3 is a block diagram illustrating an exemplary architectural arrangement of clients, servers, and external services, according to an embodiment of the disclosure herein.

In some embodiments, systems may be implemented on a distributed computing network, such as one having any number of clients and/or servers. Referring now to FIG. 3, there is shown a block diagram depicting an exemplary architecture for implementing at least a portion of a system according to an embodiment on a distributed computing network. According to the embodiment, any number of clients 330 may be provided. Each client 330 may run software for implementing client-side portions of the embodiments and clients may comprise a system 200 such as that illustrated in FIG. 2. In addition, any number of servers 320 may be provided for handling requests received from one or more clients 330. Clients 330 and servers 320 may communicate with one another via one or more electronic networks 310, which may be in various embodiments any of the Internet, a wide area network, a mobile telephony network, a wireless network (such as WiFi, Wimax, and so forth), or a local area network (or indeed any network topology known in the art; no one network topology is preferred over any other). Networks 310 may be implemented using any known network protocols, including for example wired and/or wireless protocols.

In addition, in some embodiments, servers 320 may call external services 370 when needed to obtain additional information, or to refer to additional data concerning a particular call. Communications with external services 370 may take place, for example, via one or more networks 310. In various embodiments, external services 370 may comprise web-enabled services or functionality related to or installed on the hardware device itself. For example, in an embodiment where client applications 230 are implemented on a smartphone or other electronic device, client applications 230 may obtain information stored in a server system 320 in the cloud or on an external service 370 deployed on one or more of a particular enterprise's or user's premises.

In some embodiments, clients 330 or servers 320 (or both) may make use of one or more specialized services or appliances that may be deployed locally or remotely across one or more networks 310. For example, one or more databases 340 may be used or referred to by one or more embodiments. It should be understood by one having ordinary skill in the art that databases 340 may be arranged in a wide variety of architectures and using a wide variety of data access and manipulation means. For example, in various embodiments one or more databases 340 may comprise a relational database system using a structured query language (SQL), while others may comprise an alternative data storage technology such as those referred to in the art as "NoSQL" (for example, Hadoop Cassandra, Google BigTable, and so forth). In some embodiments, variant database architectures such as column-oriented databases, in-memory databases, clustered databases, distributed databases, or even flat file data repositories may be used. It will be appreciated by one having ordinary skill in the art that any combination of known or future database technologies may be used as appropriate, unless a specific database technology or a specific arrangement of components is specified for a particular embodiment herein. Moreover, it should be appreciated that the term "database" as used herein may refer to a physical database machine, a cluster of machines acting as a single database system, or a logical database within an overall database management system. Unless a specific meaning is specified for a given use of the term "database", it should be construed to mean any of these senses of the word, all of which are understood as a plain meaning of the term "database" by those having ordinary skill in the art.

Similarly, most embodiments may make use of one or more security systems 360 and configuration systems 350. Security and configuration management are common information technology (IT) and web functions, and some amount of each are generally associated with any IT or web systems. It should be understood by one having ordinary skill in the art that any configuration or security subsystems known in the art now or in the future may be used in conjunction with embodiments without limitation, unless a specific security 360 or configuration system 350 or approach is specifically required by the description of any specific embodiment.

In various embodiments, functionality for implementing systems or methods may be distributed among any number of client and/or server components. For example, various software modules may be implemented for performing various functions, and such modules can be variously implemented to run on server and/or client components.

While the foregoing has illustrated and described several embodiments in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the disclosure are desired to be protected.

What is claimed is:

1. A method for generating and playing online presentations, comprising:
    with a first computer processor, receiving input data from a user;
    with the first computer processor, providing the input data from the user to a second computer processor via a computer network;
    after receiving the input data, with the second computer processor, generating one or more portions of an audio track for an online presentation, the audio track including information related to at least a portion of the input data;
    after receiving the input data, with the second computer processor, generating on-the-fly one or more visual slides for the online presentation, the one or more slides including information related to at least a portion of the input data, wherein the on-the-fly generation of the one or more visual slides includes creating the one or more visual slides using the input data and after receiving the input data;
    after receiving the input data, with the second computer processor, generating synchronization information that includes when in each audio track a particular one of the one or more visual slides should be displayed;
    with the second computer processor, providing the audio track, the visual slides, and the synchronization information to the first computer processor via the computer network for the user to access; and
    with the first computer processor, playing the audio track for the user while displaying the one or more visual slides for the user in accordance with the synchronization information;
    wherein a majority of the one or more visual slides are displayed for a full second or more while the audio track is played so that a movie-like experience is provided to the user solely from the audio track and the one or more visual slides provided via the computer network;
    wherein the second computer processor generates graphics on the fly that are at least partially based on the input data; and
    based thereon, overlaying the graphics on top of one or more of the visual slides;
    wherein at least portions of the graphics were created subsequently to the input data being provided to the first computer processor.

2. A method as defined in claim 1, wherein the input data includes the user's name.

3. A method as defined in claim 1, wherein the input data includes the user's birth date.

4. A method as defined in claim 1, wherein generating one or more portions of the audio track includes using one or more pre-recorded audio clips that include the user's name.

5. A method as defined in claim 1, wherein the synchronization information includes the length of time to display each slide.

6. A method for generating online presentations, comprising:
    with a first computer processor, receiving input data from a user that visits a website via a computer network;
    after receiving the input data, with a second computer processor, generating one or more portions of an audio track for an online presentation, the audio track including information related to at least a portion of the input data;
    after receiving the input data, with the second computer processor, generating on-the-fly one or more visual slides for the online presentation, the one or more slides including information related to at least a portion of the input data, wherein the on-the-fly generation of the one or more visual slides includes creating the one or more visual slides using the input data and after receiving the input data;
    with the second computer processor, generating synchronization information that specifies when each slide should be displayed relative to the audio track; and
    with the second computer processor, providing the audio track, the visual slides, and the synchronization information via the computer network for the user to access and wherein a majority of the one or more visual slides are displayed for a full second or more while the audio track is played so that a movie-like experience is provided to the user solely from the audio track and the one or more visual slides provided via the computer network;
    wherein the second computer processor generates graphics on the fly that are at least partially based on the input data; and
    based thereon, overlaying the graphics on top of one or more of the visual slides;
    wherein at least portions of the graphics were created subsequently to the input data being provided to the first computer processor.

7. A method as defined in claim 6, wherein the audio track is composed of a plurality of sequential frames, where each frame contains one or more audio files.

8. A method as defined in claim 7, wherein the audio track has a time length that is the sum of each of the time durations of the sequential frames.

9. A method as defined in claim 7, wherein the synchronization information provides that each sequential frame has a slide to be displayed at the start thereof.

10. A method as defined in claim 6, wherein one or more of the visual slides has accompanying information related to the time duration for the slide to be displayed.

11. A method as defined in claim 6, wherein the audio track is composed of a plurality of sequential frames, where each frame contains one or more audio files, and wherein the synchronization information includes information associated with each slide that specifies which audio file it is to be displayed with and at what point in time in the audio file it is to be displayed.

12. A method as defined in claim 6, wherein portions, but less than all, of the audio tracks and less than all of the slides are provided to the user before additional portions of the audio track and additional slides are generated.

13. A method for playing back online presentations, comprising:
- a web browser providing input data via a computer network to a website about a user of the web browser that visits the website;
- the web browser subsequently receiving from the website via the computer network an audio track for a presentation, visual slides for the presentation, and synchronization information for the presentation, wherein the synchronization information specifies when each slide should be displayed relative to the audio track; and
- based thereon, the web browser playing the audio track for the user while displaying the visual slides in accordance with the synchronization information, wherein a majority of the one or more visual slides are displayed for a full second or more while the audio track is played so that a movie-like experience is provided to the user solely from the audio track and the one or more visual slides provided via the computer network;
- wherein at least portions of the visual slides and the synchronization information were created subsequently to the input data being provided to the website;
- wherein the web browser generating graphics that are at least partially based on the input data; and
- based thereon, the web browser overlaying the graphics on top of one or more of the visual slides;
- wherein at least portions of the graphics were created subsequently to the input data being provided to the website.

14. A method as defined in claim 13, wherein the input data includes the user's name.

15. A method as defined in claim 13, wherein the input data includes the user's birth date.

16. A method as defined in claim 13, wherein generating one or more portions of the audio track includes using one or more pre-recorded audio clips that include the user's name.

17. A method as defined in claim 13, wherein the synchronization information includes the length of time to display each slide.

* * * * *